United States Patent [19]

Nakamura et al.

[11] Patent Number: 4,702,083
[45] Date of Patent: Oct. 27, 1987

[54] CONTROL SYSTEM AND METHOD FOR CONTROLLABLE OUTPUT TYPE HYDRAULIC FLUID PUMP OF AUTOMATIC TRANSMISSION PROVIDING DECREASED PUMP OUTPUT IN ASSOCIATION WITH THE ENGINE STARTING CONDITION

[75] Inventors: Shinya Nakamura; Seitoku Kubo; Yutaka Taga, all of Toyota, Japan

[73] Assignee: Toyota Jidosha Kabushiki Kaisha, Toyota, Japan

[21] Appl. No.: 792,980

[22] Filed: Oct. 30, 1985

[30] Foreign Application Priority Data

Oct. 30, 1984 [JP] Japan ................................ 59-228713
Oct. 30, 1984 [JP] Japan ................................ 59-228714

[51] Int. Cl.$^4$ ................................................. F04B 9/00
[52] U.S. Cl. ...................................... 60/721; 417/316
[58] Field of Search ............... 417/218, 316, 219, 220, 417/221, 222, 45, 10; 74/867, 868, 869, 850

[56] References Cited

U.S. PATENT DOCUMENTS

| | | | |
|---|---|---|---|
| 1,042,980 | 10/1912 | Shawver | 417/46 |
| 2,646,205 | 7/1953 | Rosenschold | 417/28 X |
| 3,020,716 | 2/1962 | Greenly | 417/218 X |
| 4,274,257 | 6/1981 | Koch et al. | 417/222 |

Primary Examiner—Edward K. Look
Attorney, Agent, or Firm—Oblon, Fisher, Spivak, McClelland, & Maier

[57] ABSTRACT

An automatic transmission, for a vehicle with an engine, includes a hydraulic fluid pump which supplies pressurized hydraulic fluid. It is detected whether or not the engine is being started, and the pump output is controlled so as to be decreased when the engine is being started. If the pump is one whose output per one revolution of its input member is variable, then its output may be thus controlled by decreasing its output per one revolution when the engine is being started. And, if the pump is a variable capacity type vane type hydraulic fluid pump the output of which per one revolution of its input member is controlled by varying the eccentric position of a controlling member thereof, then its output per one revolution may be thus controlled by varying this eccentric position to give a pump output per one revolution decreased when the engine is being started. Alternatively, if the pump is a fixed capacity type electrically driven type hydraulic fluid pump the output of which per one revolution of its input member is substantially constant, then its output may be thus controlled by decreasing the rotation speed of its input member, possibly to zero, when the engine is being started. A system for implementing this method is also disclosed.

28 Claims, 16 Drawing Figures

CONTROL SYSTEM AND METHOD FOR CONTROLLABLE OUTPUT TYPE HYDRAULIC FLUID PUMP OF AUTOMATIC TRANSMISSION PROVIDING DECREASED PUMP OUTPUT IN ASSOCIATION WITH THE ENGINE STARTING CONDITION

The present invention relates to a control system and method for a hydraulic fluid pump whose output is controllable and which is incorporated in an automatic transmission for a vehicle with an engine; and more particularly relates to such a control system and method for such a pump which provide good and appropriate hydraulic fluid pressure for the various operating elements of said transmission in a wide range of engine operational conditions, and particularly which reduces the load on the vehicle battery when said battery is cranking said engine of the vehicle in order to start it.

A typical automatic transmission for a vehicle comprises a gear transmission mechanism which can selectively provide any one of a plurality of forward speed stages (gearing ratios) between its power input shaft connected to the crankshaft of the vehicle engine via a torque converter and its power output shaft connected to the driven road wheels of the vehicle, so as to transmit rotational power therebetween. And such a gear transmission mechanism, which typically comprises a plurality of selectively engagable gear trains, is set in a determinate way to one or the other of said plurality of forward speed stages according to the current values of various operational parameters of the internal combustion engine and of the vehicle incorporating it, by engagement and disengagement in appropriate combinations of various friction engaging devices (hydraulic clutches and hydraulic brakes) incorporated in said transmission, under the control of a control system. In other words, this control system, on an ongoing basis according to the particular current values of said operational parameters, supplies actuating hydraulic fluid pressures to those appropriate ones of said friction engaging devices which are currently required to be engaged, while not supplying such actuating hydraulic fluid pressure to those appropriate ones of said friction engaging devices which are currently required not to be engaged. And the manner in which said plurality of forward speed stages is thus selected between according to the current values of said vehicle operational parameters is conventionally described by one or more shift diagrams.

Now, a torque converter for such an automatic transmission is typically filled with hydraulic fluid which circulates in the general circulation pattern of a smoke ring around a toroidal shape defined by a pump impeller, a turbine member, and a stator member, and accordingly a supply of pressurized hydraulic fluid is constantly required for said torque converter. Similarly, for being supplied as actuating hydraulic fluid pressures to those appropriate ones of said friction engaging devices which are currently required to be engaged, such a supply of pressurized hydraulic fluid is again required, typically a supply of so called line hydraulic fluid pressure which is selectively switched by one or more speed switching valves to be supplied to the friction engaging devices. This supply is typically provided by a hydraulic fluid pump; and, since this pressurized hydraulic fluid supply is required whether the vehicle is moving or not, and in all of the speed stages of the automatic transmission, it is usual to drive such a hydraulic fluid pump from the power input shaft of the automatic transmission as a whole, i.e. typically from the pump impeller member of the torque converter, which rotates along with the rotation of the crankshaft of the vehicle engine.

In the case of such a hydraulic fluid pump which is thus directly driven by the rotation of the crankc shaft of the vehicle engine, the problem arises that the pump is rotationally driven even while the starter motor for the engine is cranking said engine in order to start it, and this imposes an extra load on said starter motor and means that extra torque is required therefrom. Accordingly the size and weight of the starter motor are required to be greater than would be required if no such hydraulic fluid pump were fitted to the transmission, in order to provide the desired level of engine startability; or, alternatively, if the starter motor is provided as being of only the size which is required for starting the engine by itself when it is not driving any such transmission hydraulic fluid pump, then the startability of the engine is deteriorated when it is coupled to a transmission incorporating such a hydraulic fluid pump. Further, similar problems arise with regard to the capacity of the vehicle battery, which is similarly required to be greater in order to rotate the hydraulic fluid pump while the engine is being cranked. Since during cranking of the engine no transmission action is required from or indeed is acceptable for the transmission, at this time the operation of such a transmission hydraulic fluid pump is in itself not required, and accordingly the rotation thereof by the engine crankshaft is virtually completely futile, and further is wasteful of energy and deteriorates to some extent the fuel consumption of the vehicle as a whole.

As a possible means of overcoming this additional torque problem, it might be considered to provide an electrically driven transmission hydraulic fluid pump, not rotationally connected to the engine crankshaft at all. But this expedient, without additional development, would still fall prey to a similar problem: when the battery was cranking the engine to start it, the additional load on said battery unnecessarily imposed by such an electrically driven transmission hydraulic fluid pump would reduce engine startability, in a fashion analogous to that described above for the case of a mechanical transmission hydraulic fluid pump.

Meanwhile, in other connections, various variable capacity type transmission hydraulic fluid pumps have been proposed. See, for example: SAE Technical Paper Serial No. 790725 (Society of Automotive Engineers, June 1979); Jidoosha Kogaku Zensho (Automotive Engineering Papers) "Power Transmission Device", Nov. 15, 1980, Sankaido (pub.) pp. 273-238; and Nissan Technical Report No. 19 (December 1983), pp. 70-76; none of which it is intended hereby to admit as prior art to the present patent application except to the extent otherwise required by law. Reference should also be made to copending and coassigned patent application Ser. No. 785,404, filed Oct. 8, 1985, which, again, it is not intended hereby to admit as prior art to the present patent application except to the extent otherwise required by law. In these proposals, there are proposed variable capacity pumps, the outputs of which are reduced either in response to increase of pump output or in response to increased crankshaft rotational speed. Accordingly, in these proposals, the output of the pump is strived to be kept constant, and this is done in order that wasted extra pump output should be minimized, power loss being accordingly avoided or reduced. However, these proposals do not address the problems outlined above.

SUMMARY OF THE INVENTION

Accordingly, it is the primary object of the present invention to provide a control method for a hydraulic fluid pump of a variable output type included in an automatic transmission, which can solve the problems detailed above.

It is a further object of the present invention to provide such a control method for such a pump, which can satisfactorily perform output control of said hydraulic fluid pump.

It is a further object of the present invention to provide such a control method for such a pump, which reduces or prevents the imposition of undue torque load on the starter motor for the vehicle engine when it is cranking said engine to start it.

It is a further object of the present invention to provide such a control method for such a pump, which reduces or prevents the imposition of undue electrical load on the battery of the vehicle when it is supplying power to said starter motor for the vehicle engine when said starter motor is cranking said engine to start it.

It is a further object of the present invention to provide such a control method, which does not waste output power or torque of said vehicle engine starter motor.

It is a further object of the present invention to provide such a control method for such a pump, which aids with engine startability.

It is a further object of the present invention to provide such a control method for such a pump, which allows said starter motor of said engine to be of smaller capacity than would otherwise be the case.

It is a further object of the present invention to provide such a control method for such a pump, which can be simply implemented.

It is a further object of the present invention to provide such a control method, which maintains vehicle operational efficiency.

It is a further object of the present invention to provide such a control method, which ensures that the elements of the transmission are definitely well supplied with good lubrication at all times.

It is a further object of the present invention to provide such a control method, which aids with maintaining good vehicle fuel economy.

It is a further object of the present invention to provide a system for control of such a variable output type hydraulic fluid pump included in such an automatic transmission, which aids in the achievement of the above identified method objects.

According to the present invention, these and other objects are accomplished by a control method for a hydraulic fluid pump comprised in and supplying pressurized hydraulic fluid for a hydraulically actuated automatic transmission system for a vehicle driven by an engine, comprising the steps of: deciding whether or not said engine is being started; and: controlling the output of said hydraulic fluid pump to be decreased when it is thus decided that said engine is being started; and by a control system for a hydraulic fluid pump comprised in and supplying pressurized hydraulic fluid for a hydraulically actuated automatic transmission system for a vehicle driven by an engine, comprising: a means for deciding whether or not said engine is being started; and: a means for controlling the output of said hydraulic fluid pump to be decreased when it is thus decided that said engine is being started.

According to such a structrue and such a method, satisfactory control of said hydraulic fluid pump can be exerted. It is ensured that the imposition of undue torque load on the starter motor for the vehicle engine when it is cranking said engine to start it is avoided, and further that similar imposition at such a time of undue electrical load on the battery of the vehicle is likewise avoided. Thus, output power or torque of said vehicle engine starter motor are not wasted, which aids with engine startability, and allows said starter motor of said engine to be of smaller capacity than would otherwise be the case. And, as will be seen later, this control method for such a pump can be simply implemented, thereby maintaining vehicle operational efficiency, and further ensuring that the elements of the transmission are definitely well supplied with good lubrication at all times, as well as aiding with maintaining good vehicle fuel economy.

The pump may be one whose output per one revolution of its input member is variable, and then said output of said hydraulic fluid pump is preferably thus controlled by decreasing said output of said pump per one revolution of its input member when said engine is being started; and, further, said hydraulic fluid pump may be a variable capacity type vane type hydraulic fluid pump the output of which per one revolution of its input member is controlled by varying the eccentric position of a controlling member thereof; and then in this case, as a further specilization of the present invention, said output of said hydraulic fluid pump per one revolution of its input member may be thus controlled by varying said eccentric position of said controlling member to give an output of said pump per one revolution of its input member which is decreased when said engine is being started. On the other hand, if said hydraulic fluid pump is a fixed capacity type electrically driven type hydraulic fluid pump the output of which per one revolution of its input member is substantially constant, then said output of said hydraulic fluid pump may be thus controlled by varying the rotation speed of its said input member to be decreased when said engine is being started.

As a further specialization of the method aspect of the present invention, said decision that said engine is being started may be accomplished by detecting whether or not a starter switch for supplying current to a starter motor for said engine is ON or OFF, in which case said output of said hydraulic fluid pump may be increased either relatively suddenly or relatively gradually when it is detected that said starter switch for supplying current to a starter motor for said engine has transited to the OFF condition from the ON condition. Alternatively, said decision that said engine is being started may be accomplished by detecting whether or not a certain determinate time interval has elapsed since a starter switch for supplying current to a starter motor for said engine was turned ON, in which case said certain determinate time interval may be determined to be a monotonically decreasing function of a parameter representing the warming up condition of the engine, and said parameter representing the warming up condition of the engine may be engine coolant temperature, or may be engine lubricant temperature. As further alternatives, said decision that said engine is being started may be accomplished by detecting whether or not, since a starter switch for supplying current to a starter motor for said engine was turned ON, engine rotational speed has risen above a determinate value; or may be accomplished by detecting whether or not the current being supplied to a starter motor for said engine is greater than a determinate value.

And, as a further specialization of the device aspect of the present invention, said means for deciding whether or not said engine is being started may make said decision by detecting whether or not a starter switch for supplying current to a starter motor for said engine is ON or OFF, in which case it may increase said output of said hydraulic fluid pump either relatively suddenly or relatively gradually when it is detected that said starter switch for supplying current to a starter motor for said engine has transited to the OFF condition from the ON condition. As an alternative, said means for deciding whether or not said engine is being started may make said decision by detecting whether or not a certain determinate time interval has elapsed since a starter switch for supplying current to a starter motor for said engine was turned ON, in which case said certain determinate time interval may be determined to be a monotonically decreasing function of a parameter representing the warming up condition of the engine, when said parameter representing the warming up condition of the engine may be engine coolant temperature, or may be engine lubricant temperature. As further alternatives, said means for deciding whether or not said engine is being started may comprise an engine rotational speed sensor, and may make said decision by detecting whether or not, since a starter switch for supplying current to a starter motor for said engine was turned ON, engine rotational speed has risen above a determinate value; or said means for deciding whether or not said engine is being started may comprise a means for determining the current being supplied to a starter motor for said engine, and may make said decision by detecting whether or not said current is greater than a determinate value.

BRIEF DESCRIPTION OF THE DRAWINGS

The present invention will now be described with respect to a number of preferred embodiments of the apparatus and the method aspects thereof, and with reference to the illustrative drawings appended hereto. It should be clearly understood, however, that the description of the embodiments, and the drawings, are provided for the purposes of explanation and exemplification only, and are not intended to be limitative of the scope of the present invention in any way, since this scope is to be delimited solely by the accompanying claims. In the figures, spatial terms are to be understood as referring only to the orientation on the drawing paper of the illustrations of the relevant parts, unless otherwise specified; like reference numerals, unless otherwise so specified, denote the same parts and gaps and spaces and so on in the collection of figures relating to one embodiment and denote like parts and gaps and spaces and so on in figures relating to different embodiments; and:

DESCRIPTION OF THE PREFERRED EMBODIMENTS

Figure 1:
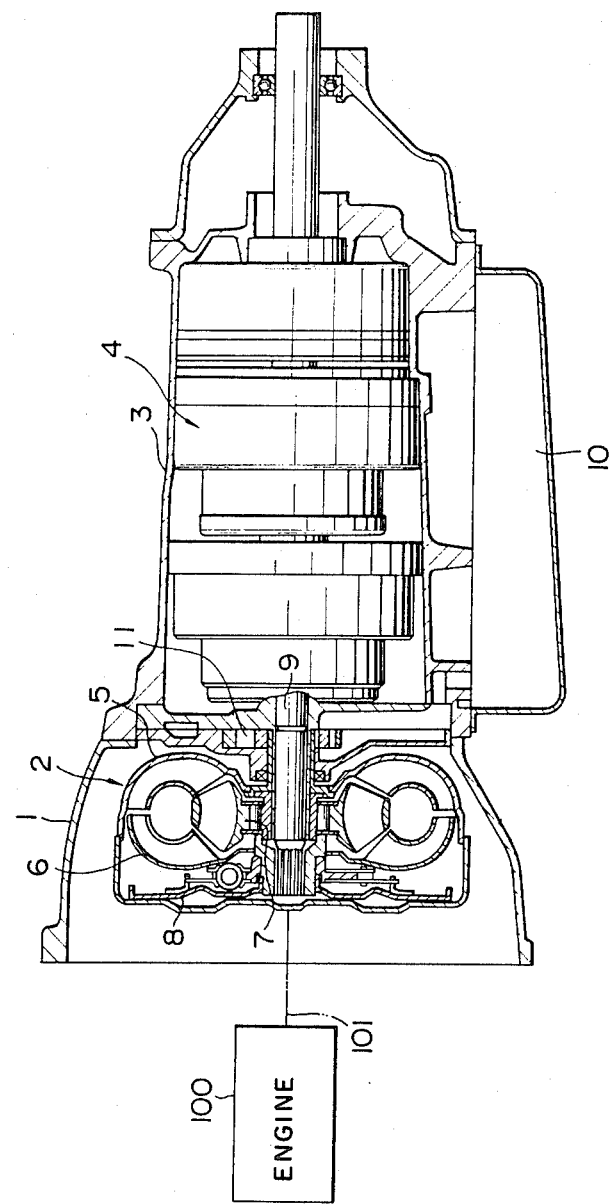
FIG. 1 is a schematic longitudinal sectional view showing the overall layout of the principal components of an automatic transmission, including a mechanical type variable output type hydraulic fluid pump, to which certain of the preferred embodiments of the present invention can be applied.

The present invention will now be described with reference to the preferred embodiments thereof, and with reference to the drawings. FIG. 1 is a schematic longitudinal sectional view showing the overall layout of the components of an automatic transmission, which is housed in a casing denoted by the reference numeral 1; and this figure is applciable to all of the first series of preferred embodiments of the present invention which will be described. In this figure, the automatic transmission is shown as being powered by an internal combustion engine 100 via a shaft 101 (the engine crankshaft, typically) which rotates at a rotational speed which will henceforward be denoted by Ne, and as transmitting output rotational power to a power output shaft which leads, although this is not particularly indicated in the figures, to a differential device for powering the driven wheels of the automotive vehicle to which this automatic transmission and this internal combustion engine 100 are fitted.

In detail, the automatic transmission comprises a fluid torque converter assembly 2 and a gear transmission mechanism 4 housed in a gear transmission mechanism casing 3. The fluid torque converter assembly 2 is supplied with rotational power via the aforementioned power output shaft 101 of the engine 100, which thus functions as a power input shaft for said fluid torque converter assembly 2; and a shaft 9 functions as a power output shaft for said fluid torque converter assembly 2 and also as a power input shaft for the gear transmission mechanism 4 and transmits rotational power therebetween.

The fluid torque converter assembly 2 is of a per se conventional three element single stage type with a lock up clutch, and comprises a pump impeller 5 rotationally connected to the power output shaft 101 of the internal combustion engine 100, a turbine member 6 rotationally connected to the power output shaft 9 for said torque converter assembly 2, and a stator member 7 mounted via a one way clutch to the casing of said fluid torque converter assembly 2. In a per se known fashion, by circulation of transmission fluid in the general circulation pattern of a smoke ring around the toroidal shape defined by the pump impeller 5, the turbine member 6, and the stator member 7, torque is transmitted from the pump impeller 5 to the turbine member 6 and thereby from the power input shaft 101 of the fluid torque converter assembly 2 to the power output shaft 9 thereof, with a certain amount of slippage and also of torque amplification being provided therebetween, the amount of such slippage and torque amplification being determined by the rotational speed Ne of the power input shaft of the torque converter assembly 2 and also by the output load on its power output shaft 9. The amount of this slippage can be ascertained by comparison of the rotational speeds of the input and output members of the torque converter 2. A lock up clutch 8 of a per se known sort is provided for, when optionally engaged by the supply of actuating hydraulic pressure thereto, directly connecting the power input shaft 101 of the torque converter assembly 2 to the power output shaft 9 thereof, thus bypassing the above described hydraulic connection for the torque converter assembly 2 and eliminating said slippage and torque amplification provided thereby. And in the first group of preferred device embodiments of the present invention a hydraulic fluid pressure pump 11, which will be described in detail hereinafter, is arranged between the torque converter assembly 2 and the gear transmission mechanism 4, and is rotationally driven by the pump impeller 5 of said torque converter assembly 2, i.e. is driven at the rotatinal speed Ne of the crankshaft 101 of the engine 100.

The gear transmission mechanism 4 will not be particularly shown or explained in detail with regard to its structure, since it may be per se conventional. In outline, this gear transmission mechanism 4 comprises a plurality of planetary gear mechanisms which are per se conventional and a plurality of friction engaging mechanisms, i.e. clutches and brakes, of per se conventional types each of which is engaged when hydraulic fluid pressure is supplied to its actuating pressure chamber, while it is disengaged when no hydraulic fluid pressure is supplied to its said actuating pressure chamber. Thus, by selective engagement and disengagement of these hydraulic clutches and brakes, the gear transmission mechanism 4 can be controlled to provide any one of a plurality of forward gearing ratios or rotational speed stages (as well as, typically, at least one reverse gearing ratio or rotational speed stage) between its power input shaft 9 and its power output shaft, in a manner which is per se known to one of ordinary skill in the relevant art based upon the above explanations.

Figure 2:
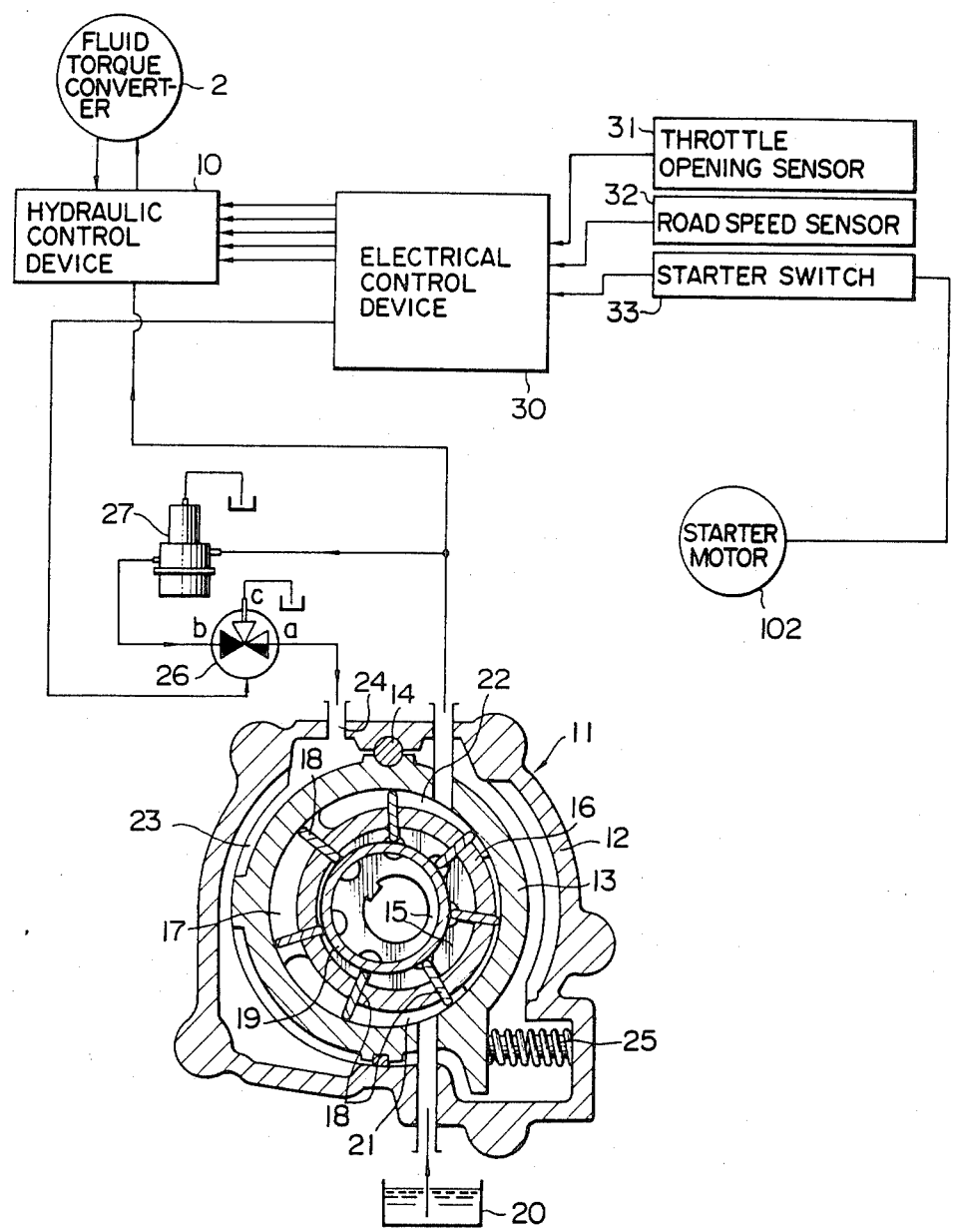
FIG. 2 is a combination drawing, showing a schematic block diagram including as blocks relevant parts of a first preferred embodiment of the control system of the present invention, and also showing a transverse cross sectional view of a mechanical type of hydraulic fluid pump which is controlled by said first preferred embodiment.

In general, each of the various hydraulic clutches and brakes referred to above, as well as the lock up clutch 8 incorporated in the torque converter assembly 2, is selectively engaged and disengaged by its hydraulic actuator system, by selective supply of hydraulic fluid pressure thereto from a control system which will now be described, according to the current values of various operational parameters of the vehicle to which this automatic transmission is fitted, such as vehicle road speed, engine load, range set by the vehicle driver on a manual range setting valve, and so on. This control system is of the hybrid hydraulic/electronic type incorporating a microprocessor, and in FIG. 2 a schematic block diagram of relevant parts of said control system is shown. This FIG. 2 is largely applicable, mutatis mutandis as will be seen hereinafter, to various ones of a first set of preferred embodiments of the present invention, and includes parts thereof as subsystems; also, this FIG. 2 shows a transverse cross sectional view of the hydraulic fluid pump 11 controlled by this first set of preferred embodiments, which is a mechanical type of hydraulic fluid pump whose output can be hydraulically regulated.

First to describe with regard to its function this hydraulic fluid pump 11, which as explained above is rotationally driven by the engine 100 at crankshaft speed Ne via the pump impeller 5 of the torque converter 2, said pump 11 picks up hydraulic fluid from a sump 20 and supplies it under pressure to a line pressure regulation valve, not particularly shown. The line pressure regulation valve selectively bleeds off some of said pressurized hydraulic fluid back to the sump 20 so as to produce a line pressure. This line pressure is then supplied to the fluid torque converter assembly 2, and also to various elements of the transmission including a manual range setting valve, a lock up clutch control valve, and various speed switching valves which are controlled by solenoid valves. The line pressure regulation value and these various switching valves and solenoid valves are together considered herein as incorporated in an electrically controlled hydraulic fluid pressure control device 10, which as shown in FIG. 1 is located generally under the gear transmission mechanism 4 within a sump defining member thereof. The hydraulic control device 10 is controlled by an electrical control device 30, which thus controls the engagement and disengagement of the various hydraulic clutches and brakes discussed above. A microcomputer incorporated in this electrical control device 30 receives input signals from means and sensors including: a throttle opening sensor 31, which senses the position of the throttle pedal (not particularly shown) of the internal combustion engine 100 of the vehicle and which produces an output signal representative thereof, which is taken as representative of engine load; a road speed sensor 32, which produces an output signal representative of vehicle road speed; and a starter motor switch 33 for the vehicle, which controls supply of electrical power to the starter motor 102 for the internal combustion engine 100, and which accordingly furnishes an output signal representative of whether or not said starter motor 102 is being operated to crank said engine 100, i.e. representative of the cranking or non cranking condition of the engine 100. And the microcomputer executes a control program for setting the various clutches and brakes detailed above to be engaged or disengaged, and for controlling the output pressure of the pump 11 as will be explained shortly, by appropriate supply or non supply of ON/OFF electrical control signals to the solenoid valves controlling the speed shifting valves, etc.

Now to describe the hydraulic fluid pump 11 with regard to its structure which is of the vane type, it has a housing 12 in which a slide ring 13 is pivotally supported by a pivot 14, so as to be able to sway to the right or to the left (counterclockwise or clockwise respectively) from the point of view of the figure through a relatively small angle. The slide ring 13 is formed with a cylindrical inner cavity, and in this cavity there is rotatably mounted a disk shaped rotor member 15 which is provided with a plurality of axially projecting sector shaped portions 16 with radial slots defined between them. This rotor member 15, in this first set of embodiments, is rotationally driven by the engine 100 at crankshaft speed Ne, via the pump impeller of the torque converter as described above, and slidably supports a plurality of vane members 18 in the abovementioned radial slots provided between said sector shaped projections 16. In the space generally defined between the projections 16, resting axially against the disk shape of the rotor member 15 and located in front of it from the point of view of the drawing, there is provided a vane ring 19 which is positioned as coaxial with the aforementioned cylindrical inner cavity of the slide ring 13. Thus, a plurality of pump chambers 17 are defined between the cylindrical inner surface of the slide ring 13 and the cylindrical outer surface of the vane ring 19 with regard to the radial direction, and between the vanes 18 with regard to the circumferential direction. With the slide ring 13 and the vane ring 19 in their positions as shown in the figure, the rotor member 15 is eccentrically positioned with its axial projections 16 also positioned eccentrically between said slide ring 13 and said vane ring 19, so that, as said rotor member 15 with its projections 16 rotate together at engine crankshaft speed as explained above and carry the vane members 18 around with them in a direction shown as the clockwise direction in the figure, each of the pump chambers 17, considered individually, expands and contracts rhythmically. An input port 21 is provided at an appropriate part of the inner side wall surface of the slide ring 13, to communicate to these pump chambers 17 in turn as they pass it in the leftwards direction as seen in the figure while they are increasing in volume, so that said pump chambers 17 suck hydraulic fluid up from the sump 20 through said input port 21, and on the other hand an output port 22 is provided at another appropriate part of said inner side wall surface of the slide ring 13, to communicate to these pump chambers 17 in turn as they pass it in the rightwards direction as seen in the figure while they are decreasing in volume, so that said pump chambers 17 squirt pressurized hydraulic fluid out through said output port 22 to the hydraulic control device 10, as mentioned above. Thus, the hydraulic fluid pump 11 generates a supply of pressurized hydraulic fluid; and the output of said pump 11 per one revolution thereof, as will be readily understood based upon the foregoing explanations, depends upon the amount of eccentricity of the slide ring 13 and the vane ring 19 with respect to the rotor member 15, i.e. upon the set angular position around the axis of the pivot 14 of the slide ring 13 and the vane ring 19: the greater is the set eccentricity of the slide ring 13 the greater is the output of the pump 11 per one revolution thereof for a given engine rotational speed, and conversely the less is the set eccentricity of the slide ring 13 the less is the output of the pump 11 per one revolution thereof for a given engine rotational speed.

The angular position of this slide ring 13 is controlled as follows. A compression coil spring 25 biases the slide ring 13 to rotate in the clockwise direction around the pivot 14 as seen in the figure, while a drive chamber 23 is defined on one side of the slide ring 13, between it and the casing 12 of the pump 11, pressure in said drive chamber 23 urging said slide ring 13 to rotate in the anticlockwise direction around the pivot 14 as seen in the figure. Thus, the greater is the pressure in the drive chamber 23, the more are the slide ring 13 and the vane ring 19 displaced to rotate in the anticlockwise direction in the figure about the pivot 14 against the resistance of the compression coil spring 25 which is overcome, and the less does the eccentricity of said slide ring 13 with respect to the rotor member 15 become, so the less does the output of the pump 11 per one revolution thereof become, for a given engine rotatational speed.

Figure 3:
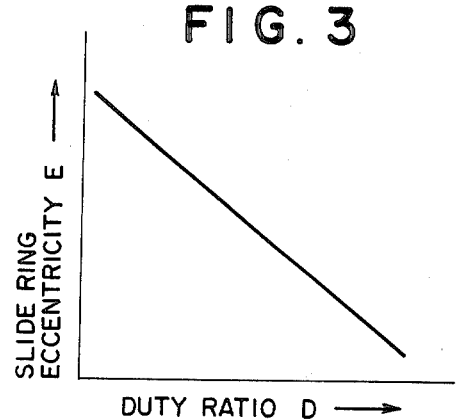
FIG. 3 is a graph showing characteristics of the aforesaid hydraulic fluid pump, in which the duty ratio D of an electrical pulse signal supplied to a controlling electromagnetic switching valve therefor is shown along the horizontal axis and the corespondingly controlled eccentricity E of a slide ring of said hydraulic fluid pump is shown along the vertical axis.

And the electrical control device sends a pulse electrical signal to an electromagnetic switching valve 26, for controlling the pressure in the drive chamber 23 in the following way. A port "b" of the electromagnetic switching valve 26 is supplied with a constant supply of hydraulic pressure from the output port 22 of the pump 11, regulated to a substantially constant pressure value by a relief valve 27. Another port "a" of said electromagnetic switching valve 26 is communicated to the drive chamber 23 via a port 24 thereof, while a third port "c" of said valve 26 is communicated to a fluid drain. The electromagnetic switching valve 26 is so structured that: when a solenoid thereof (not particularly shown) is supplied with actuating electrical energy, then its port "a" is communicated to its port "b", while its port "c" is communicated to no other port; while, on the other hand, when said solenoid thereof is not supplied with actuating electrical energy, then its port "a" is communicated to its port "c", while its port "b" is communicated to no other port. Accordingly, the greater becomes the duty ratio D of the pulse signal supplied by the electrical control device 30 to the electromagnetic switching valve 26, the greater does the pressure value supplied to the drive chamber 23 of the pump 11 become, and the less become the eccentricity of the slide ring 13 and the output of the pump 11 per one revolution thereof. In the graph of FIG. 3, the duty ratio D of the controlling electrical pulse signal from the electrical control device 30 is shown along the horizontal axis, and the correspondingly controlled eccentricity E of the slide ring 13 is shown along the vertical axis. And thus, via altering the duty ratio D of the pulse signal to the electromagnetic switching valve 26, said electrical control device 30 can set the eccentricity E of the slide ring 13, and hence the output of the pump 11 per one revolution thereof, to any required value.

It should be particularly noted, as a beneficial feature of the shown construction from the point of view of its fail safe characteristics, that if the electrical control device 30 should fail, then typically the duty ratio of the electrical signal it is dispatching to the electromagnetic switching valve 26 will become substantially zero (its voltage level dropping to zero), and in such a case the port "a" of said switching valve 26 will be permanently communicated to the port "c" thereof, and this will cause the pressure in the drive chamber 23 of the pump 11 to be substantially equal to atmospheric pressure. As will be understood from the above, in these circumstances the eccentricity E of the slide ring 13 will be maximal, and thus the output of the pump 11 per one revolution thereof will be set to its substantially maximal value, thus guarding against any serious consequences to the operational characteristics of the automatic transmission as a whole, or to the lubrication therefor. The same thing will happen if the drive chamber 26 should spring a leak. Accordingly, this shown construction has good fail safe characteristics.

Figure 4:
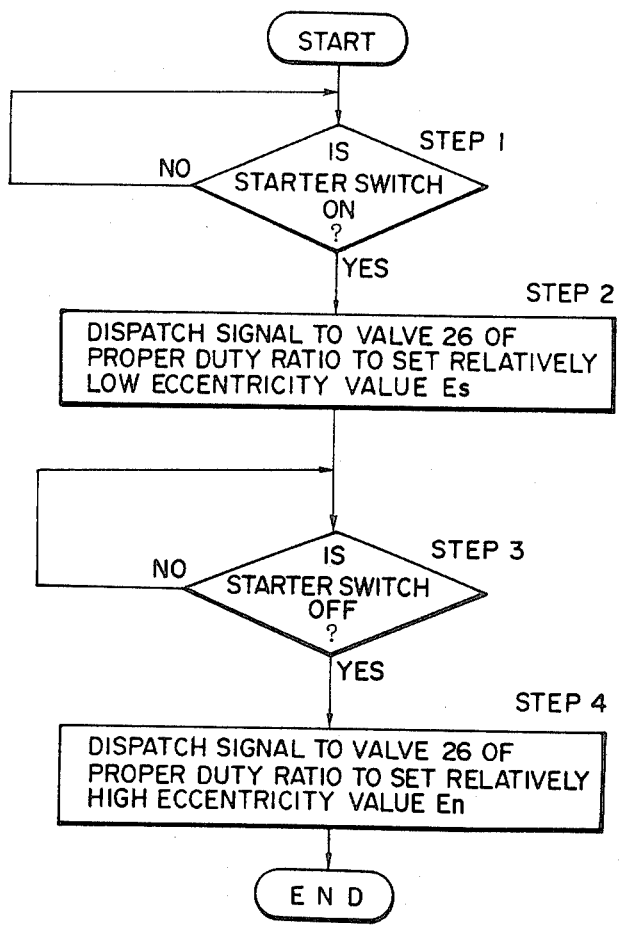
FIG. 4 is a flow chart for a portion of a program executed by a microprocessor incorporated in said first preferred embodiment of the control system of the present invention, for controlling the output pressure of said mechanical type hydraulic fluid pump of FIG. 2 according to the first preferred embodiment of the method of the present invention.

One relevant portion of the control program obeyed by the microcomputer incorporated in the electrical control device 30 will now be detailed, with reference to FIG. 4 which is a flow chart of said relevant portion. This implements the control method according to the first preferred method embodiment of the present invention, for controlling the output pressure of the hydraulic fluid pressure pump 11. This program fragment will now be described.

First, in the step 1, a decision is made as to whether or not, at this time, the switch 33 for the starter 102 of the engine 100 is ON or not, i.e. as to whether or not said starter 102 is currently being operated to crank said engine 100 to start it. This decision is made by the microcomputer based upon the signal which it receives from said starter switch 33. If the answer to this decision is YES, then next the flow of control passes to the step 2; but otherwise, if the answer to this decision is NO, the flow of control passes back to this decision step 1 again, to execute a tight loop until in fact said starter 102 starts to be operated to crank the engine 100.

In the next step 2, at which point in the FIG. 4 program it has been determined that the starter 102 has now started to be operated, an electrical pulse signal is dispatched to the electromagnetic switching valve 26 of appropriate duty ratio D to cause the eccentricity of the slide ring 13 to be set to a relatively low eccentricity value Es for engine starting; and next the flow of control passes to the step 3. By a means which is not shown but is included in the electrical control device 30, this supply of this electrical pulse signal with the duty ratio is maintained until the next similar order for altering said duty ratio is given to said means.

In this step 3, analogously to the step 1 but contrariwise, a decision is made as to whether or not, at this time, the switch 33 for the starter 102 of the engine 100 is OFF or not, i.e. as to whether or not said starter 102 is currently not being operated to crank said engine 100 to start it. Again, this decision is made by the microcomputer based upon the signal which it receives from said starter switch 33. If the answer to this decision is YES, then next the flow of control passes to the step 4; but otherwise, if the answer to this decision is NO, the flow of control passes back to this decision step 3 again, to execute a tight loop until in fact said starter 102 is no longer being operated to crank the engine 100.

In the next and final program step 4, at which point in the FIG. 4 program it has been determined that the starter 102 has now been stopped from being operated, an electrical pulse signal is dispatched to the electromagnetic switching valve 26 of appropriate duty ratio D to cause the eccentricity of the slide ring 13 to be set to a relatively high or normal eccentricity value En; and next the flow of control passes to exit from this FIG. 4 program fragment, without doing anything further. Again, by the aforesaid signal maintaining means, this supply of this electrical pulse signal with this duty ratio is maintained until the next similar order for altering said duty ratio is given to said means.

Figure 5:
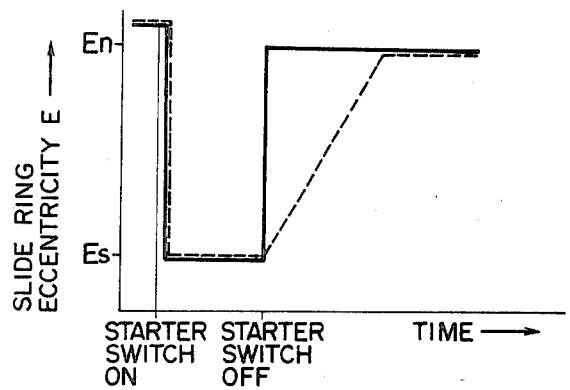
FIG. 5 is a graph relating to the operation of said first preferred embodiment, in which elapsed time is shown along the horizontal axis and the eccentricity E of said slide ring of said hydraulic fluid pump as controlled by said first preferred device embodiment is shown along the vertical axis, showing the eccentricity operational characteristics before, during, and after an engine cranking episode.

According to the control method explained above, during cranking of the engine 100 by the starter motor 102, the eccentricity E of the slide ring 13 is controlled with respect to elapsed time as shown by the solid line in the FIG. 5 graph, which is a time chart in which said eccentricity E is shown along the vertical axis and elapsed time is shown along the horizontal axis. In more detail, before the engine 100 is started to be cranked by the starter motor 102, naturally the rotational input member of the pump 11 is not being rotated at all, and accordingly said pump 11 is supplying no output pressure at all at its output side, which as explained above means that no pressure is supplied to the eccentricity control chamber 23 of said pump 11, accordingly causing the eccentricity E of the slide ring 13 to be maintained at its maximum possible value by the action of the compression coil spring 25. From this quiescent condition while the program is looping in the step 1 stage, as soon as the engine 100 is started to be cranked by the starter motor 102, the program transits through the step 2 stage to the step 3 stage and the duty ratio of the pulse signal being supplied to the electromagnetic switching valve 26 is abruptly raised and this causes the pressure output of the pump 11 initially to rise quickly up from zero, and by the feeding back of this pressure output to said eccentricity control chamber 23 of said pump 11, quickly the pump eccentricity E is set to its relatively low starting value Es, as shown in the FIG. 5 graph. And depending upon this regulation of the eccentricity E to be equal to the relatively low eccentricity value Es at this time of engine cranking, correspondingly during this engine cranking operation the output of the pump 11 is controlled to be very much less than what it is during normal transmission operation. Accordingly, the torque load imposed by said pump 11 on the starter motor 102 is much less than was the case in the case of the prior art as discussed in the earlier portions of this specification, and the electrical load on the battery (not particularly shown) of the vehicle powering said starter motor 102 is likewise significantly reduced. Thus, the starter motor 102 and the vehicle battery can be made smaller and lighter and more compact than they would otherwise be required to be, and also vehicle startability is enhanced.

On the other hand, when the engine 100 starts and the cranking thereof by the starter motor 102 is stopped, then the electrical control signal from the starter switch 33 to the electrical control device 30 so indicates, and the program passes through the step 4 stage, and thus quickly the pump eccentricity E is set to its relatively high normal value En, as shown in the FIG. 5 graph. And depending upon this regulation of the eccentricity E to be relatively high at this time of normal engine operation, correspondingly during this engine normal operation the output of the pump 11 is controlled to be very much higher than what it was during starting motor cranking operation. Accordingly, the torque load imposed by said pump 11 on the vehicle engine 100 naturally becomes relatively high, but of course since said engine 100 has now started it is well able to bear said torque load; and no particular electrical load is imposed on the battery of the vehicle. Thereby, the fluid torque converter 2 and the gear transmission mechanism 4 are properly and adequately supplied with hydraulic fluid pressure at substantially all times, according to their current operational circumstances. Thus, it is seen that, according to such a structure and such a method according to the present invention, satisfactory control of the hydraulic fluid pump can be exerted, and it is ensured that the transmission is never short of hydraulic fluid pressure during actual vehicle operation. Since high pump pressure is only provided when required, accordingly engine startability is enhanced and output power of the starter motor 102 is not wasetd. Also, good fuel economy is promoted. Further, this control system and method ensure that the elements of the transmission are definitely well supplied with good lubrication at all times.

As a variation of this first preferred embodiment, as suggested by the dashed line in FIG. 5, when the starter switch 33 was turned OFF to stop cranking the engine 100 (i.e., when said engine 100 had started), it would be possible to increase the eccentricity E of the slide ring 13 of the pump 11 by increasing the duty ratio of the electrical pulse signal supplied to the valve 26 by the electrical control device 30, not abruptly, but instead steadily over a certain time interval. Various possibilites for modification to the FIG. 4 program fragment to enable this variation will be easily conceived of by one of ordinary skill in the relevant art based upon the descriptions herein; accordingly, no explanation of any particular one thereof will be given herein, in view of the desirability of conciseness. In such a variant embodiment, problems with possible stalling of the engine 100 when it has just started, which might be caused if the output pressure of the pump 11 were required to rise too abruptly, are positively prevented.

Figure 6:
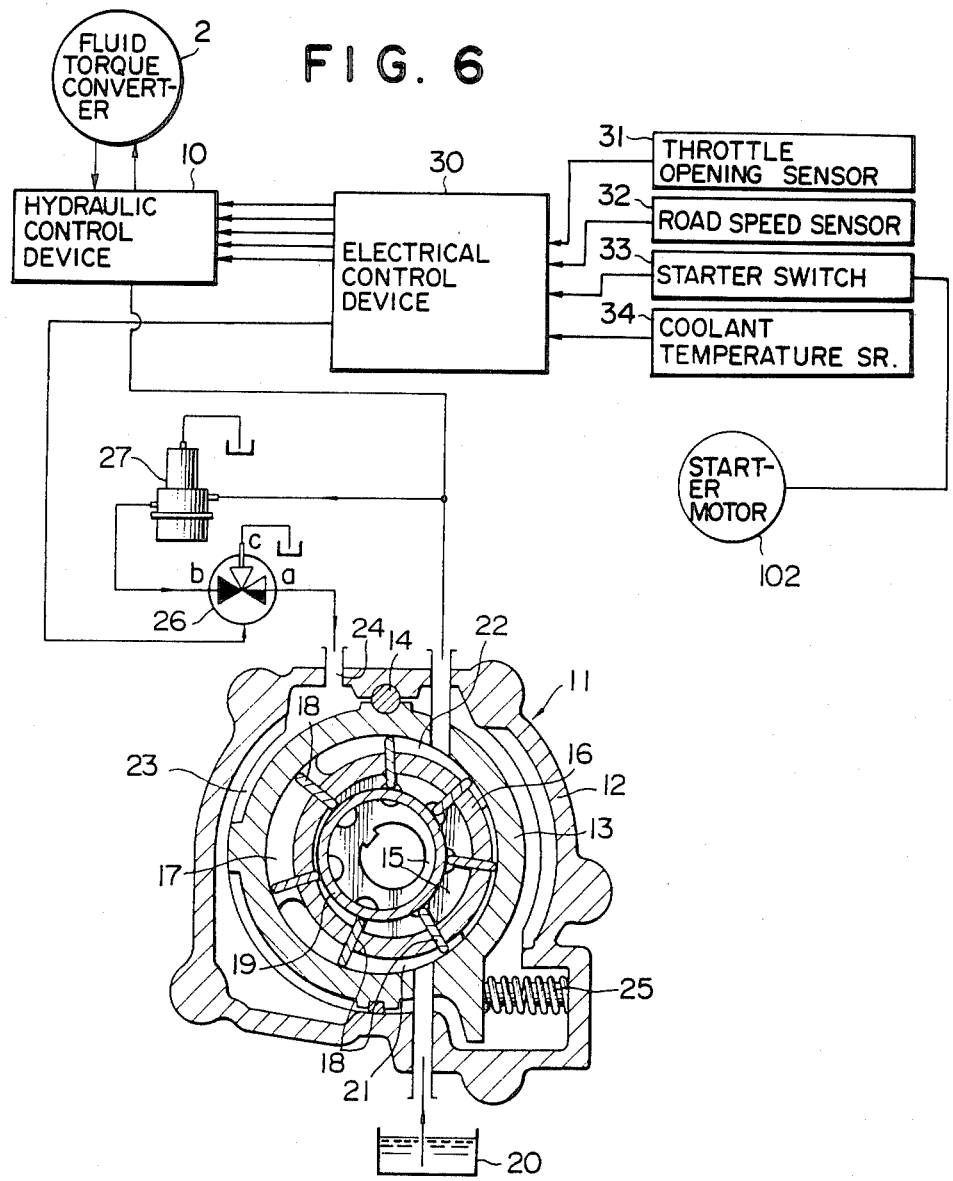
FIG. 6 is a combination drawing for the second preferred embodiment of the present invention, similar to FIG. 2 for the first preferred embodiment, and particularly showing a coolant temperature sensor further included in said second preferred embodiment.

In FIG. 6, in a fashion similar to FIG. 2, there are shown in block diagrammatical form relevant parts of the second preferred embodiment of the control system of the present invention, and also there is shown a transverse cross sectional view of the hydraulic fluid pump 11 controlled by this second preferred embodiment, which is again a mechanical type of hydraulic fluid pump whose output can be hydraulically regulated. The only physical difference in the mechanisms of this second preferred embodiment is that a coolant temperature sensor 34 is provided, which senses a parameter representative of the temperature of the coolant of the engine 100 and which dispatches an electrical output signal representative thereof to the electrical control device 30. The other portions of the transmission control device shown in FIG. 6 are similar to those described above with regard to the first preferred embodiment of the present invention. Corresponding to this new structure, in FIG. 7, in a fashion similar to FIG. 4, there is presented a flow chart showing the relevant parts of a possible program for the microcomputer incorporated in the electrical control device 30, in this second preferred embodiment of the system of the present invention, for practicing the second preferred embodiment of the method of the present invention. This program fragment, which in some ways resembles the FIG. 4 program fragment but in some ways differs therefrom, will now be described.

First, in the step 1, as before, a decision is made as to whether or not, at this time, the switch 33 for the starter 102 of the engine 100 is ON or not, i.e. as to whether or not said starter 102 is currently being operated to crank said engine 100 to start it. This decision is made by the microcomputer based upon the signal which it receives from said starter switch 33. If the answer to this decision is YES, then next the flow of control passes to the step 2; but otherwise, if the answer to this decision is NO, the flow of control passes back to this decision step 1 again, to execute a tight loop until in fact said starter 102 starts to be operated to crank the engine 100.

Figure 7:
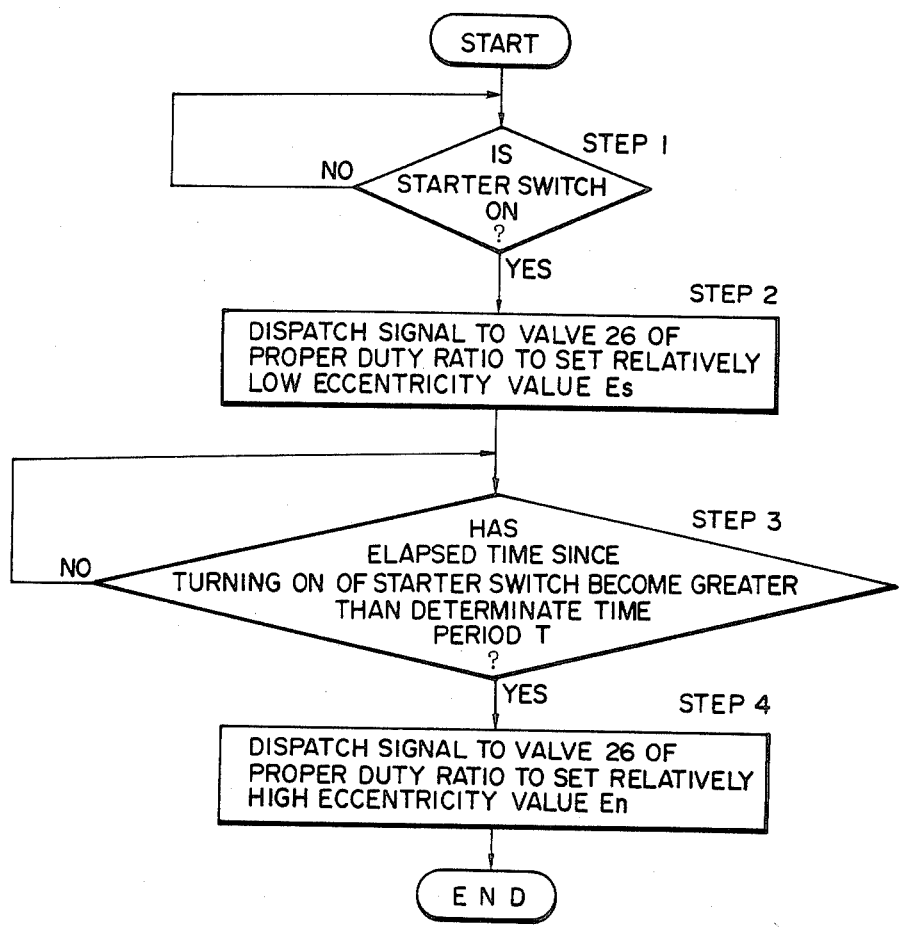
FIG. 7 is a flow chart for a portion of a program executed by a microprocessor incorporated in said second preferred embodiment of the control system of the present invention, similarly to the program for the first preferred embodiment a flow chart of which was shown in FIG. 4.

In the next step 2, at which point in the FIG. 7 program it has been determined that the starter 102 has now started to be operated, an electrical pulse signal is dispatched to the electromagnetic switching valve 26 of appropriate duty ratio D to cause the eccentricity of the slide ring 13 to be set to a relatively low eccentricity value Es for engine starting; and next the flow of control passes to the step 3. By a means which is not shown but is included in the electrical control device 30, this supply of this electrical pulse signal with this duty ratio is maintained until the next similar order for altering said duty ratio is given to said means.

In this step 3, quite differently from the corresponding step 3 of the FIG. 4 program for the first preferred embodiment, a decision is made as to whether or not, at this time, a determinate time period T has elapsed since the transition from the step 1 to the step 2 occurred and the switch 33 for the starter 102 of the engine 100 transited from the OFF state to the ON state. The elapsed time may be measured by a timer or the like that is set at the start of the step 2. It is taken as an assumption that this time period T is sufficient for the engine 100 to have started up properly, in the current engine operational conditions. The determination of the time period T is made by the microcomputer based upon the signal which it receives from the coolant temperature sensor 34: commonly, the colder is the engine 100, the longer time period said engine 100 can be expected to take for starting up. If the answer to this decision is YES, so that the time since engine cranking has first started is now equal to or longer than the time period T, then next the flow of control passes to the step 4; but otherwise, if the answer to this decision is NO, the flow of control passes back to this decision step 3 again, to execute a tight loop until in fact said starter 102 is no longer being operated to crank the engine 100.

In the next and final program step 4, after the elapsing of said determinate time period T from the start of the step 2 as explained above, an electrical pulse signal is dispatched to the electromagnetic switching valve 26 of appropriate duty ratio D to cause the eccentricity of the slide ring 13 to be set to a relatively high or normal eccentricity value En; and next the flow of control passes to exit from this FIG. 7 program fragment, without doing anything further. Again, by the aforesaid signal maintaining means, this supply of this electrical pulse signal with this duty ratio is maintained until the next similar order for altering said duty ratio is given to said means.

Figure 8:
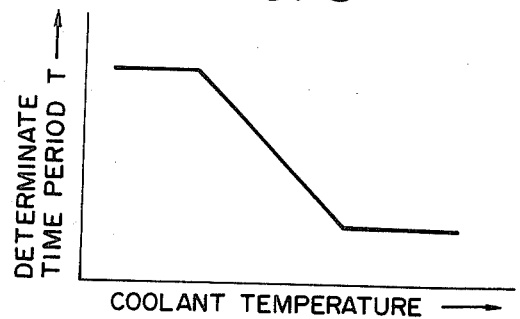
FIG. 8 is a graph relating to the operation of said second preferred embodiment, in which the magnitude of a certain determinate time period is shown along the vertical axis and the temperature of the engine coolant is shown along the vertical axis.

According to the control method explained above, during the determinate time period T after the starting of cranking of the engine 100 by the starter motor 102, the eccentricity E of the slide ring 13 is increased. This determinate time period T may be controlled with respect to engine coolant temperature by the electrical control device 30 a shown by the line in the FIG. 8 graph, which is a graph in which said determinate time period T is shown along the vertical axis and engine coolant temperature is shown along the horizontal axis. In this embodiment, before the engine 100 is started to be cranked by the starter motor 102, as before the rotational input member of the pump 11 is not being rotated at all, and accordingly said pump 11 is supplying no output pressure at all at its output side, which as explained above means that no pressure is supplied to the eccentricity control chamber 23 of said pump 11, accordingly causing the eccentricity E of the slide ring 13 to be maintained at its maximum possible value by the action of the compression coil spring 25. From this quiescent condition while the program is looping in the step 1 stage, as soon as the engine 100 is started to be cranked by the starter motor 102, the program transits through the step 2 stage to the step 3 stage and the duty ratio of the pulse signal being supplied to the electromagnetic switching valve 26 is abruptly raised and this causes the pressure output of the pump 11 initially to rise quickly up from zero, and by the feeding back of the pressure output to said eccentricity control chamber 23 of said pump 11, quickly the pump eccentricity E is set to its relatively low starting value Es. And depending upon this regulation of the eccentricity E to be equal to the relatively low eccentricity value Es at this time of engine cranking, correspondingly during this engine cranking operation the output of the pump 11 is controlled to be very much less than what it is during normal transmission operation. Accordingly, the torque load imposed by said pump 11 on the starter motor 102 is much less than was the case in the case of the prior art as discussed in the earlier portions of this specification, and the electrical load on the battery (not particularly shown) of the vehicle powering said starter motor 102 is likewise significantly reduced. Thus, the starter motor 102 and the vehicle battery can be made smaller and lighter and more compact than they would otherwise be required to be, and also vehicle startability is enhanced.

On the other hand, after the time interval T, it is assumed that the engine 100 has started and that the cranking thereof by the starter motor 102 has stopped, and then the program passes through the step 4 stage, and thus quickly the pump eccentricity E is set to its relatively high normal value En. And depending upon this regulation of the eccentricity E to be relatively high at this time of normal engine operation, correspondingly during this engine normal operation the output of the pump 11 is controlled to be very much higher than what it was during starting motor cranking operation. According, the torque load imposed by said pump 11 on the vehicle engine 100 naturally becomes relatively high, but of course since said engine 100 has now started it is well able to bear said torque load; and no particular electrical load is imposed on the battery of the vehicle. Accordingly, the same type of advantages as obtained by the first preferred embodiment of the present invention are obtained.

As a variation of this secod preferred embodiment, the temperature sensed by the sensor 33 could be the temperature of the lubricant of the engine 100, rather than the temperature of the coolant thereof. Such a variatn embodiment provides substantially the same advantages as does the described second preferred embodiment, via a somewhat different route.

Figure 9:
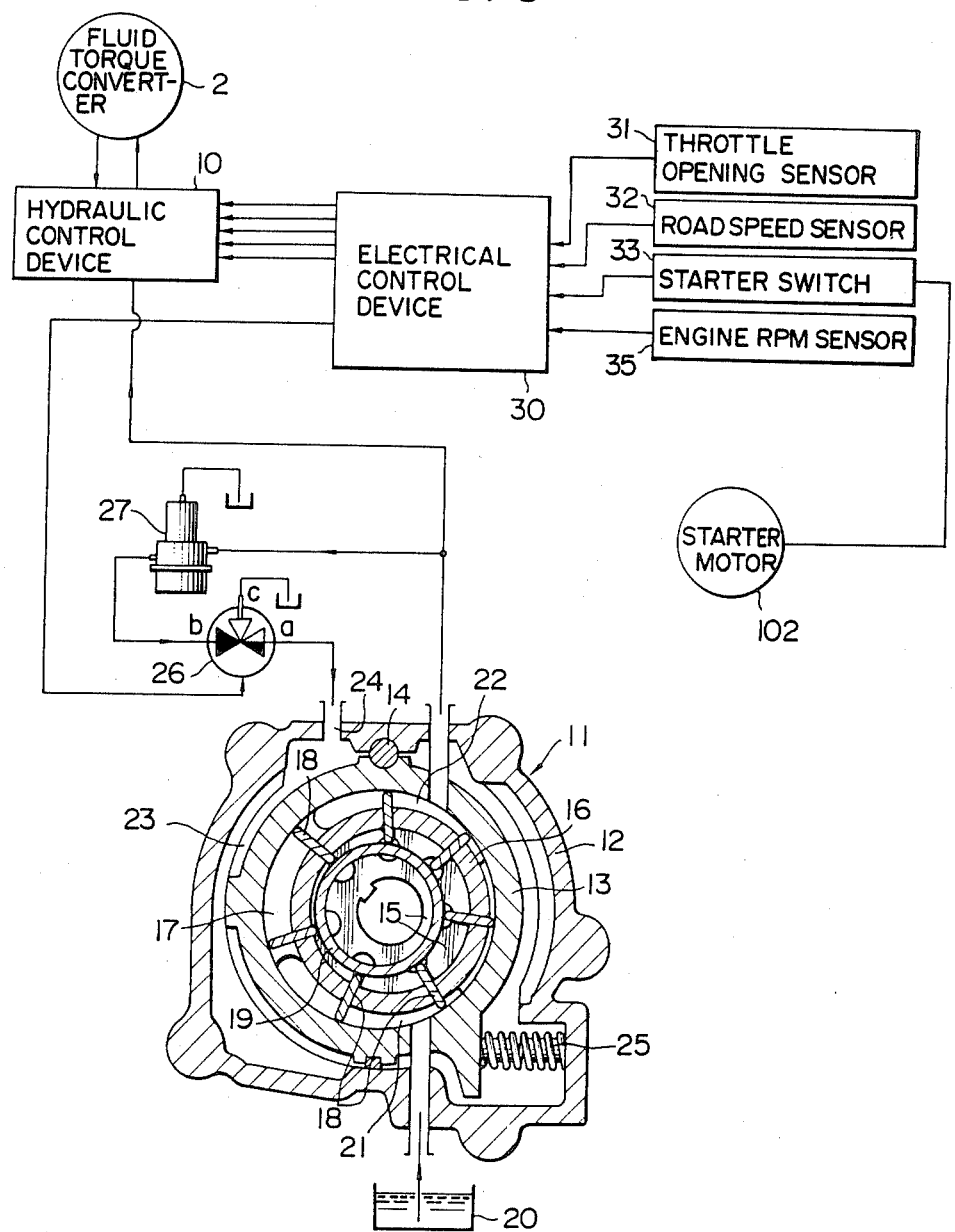
FIG. 9 is a combination drawing for the third preferred embodiment of the present invention, similar to FIGS. 2 and 6 for the first and second preferred embodiments, and particularly showing an engine rotational speed sensor further included in said third preferred embodiment.

In FIG. 9, in a fashion similar to FIG. 2, there are shown in block diagrammatical form relevant parts of the third preferred embodiment of the control system of the present invention, and also there is shown a transverse cross sectional view of the hydraulic fluid pump 11 controlled by this third preferred embodiment, which is again a mechanical type of hydraulic fluid pump whose output can be hydraulically regulated. The only physical difference in the mechanisms of this third preferred embodiment is that a engine revolution speed sensor 35 is provided, which senses a parameter representative of the revolution speed Ne of the crankshaft 101 of the engine 100 and which dispatches an electrical output signal representative thereof to the electrical control device 30. The other portions of the transmission control device shown in FIG. 9 are similar to those described above with regard to the first preferred embodiment of the present invention. Corresponding to this new structure, in FIG. 10, in a fashion similar to FIG. 4, there is presented a flow chart showing the relevant parts of a possible program for the microcomputer incorporated in the electrical control device 30, in this third preferred embodiment of the system of the present invention, for practicing the third preferred embodiment of the method of the present invention. This program fragment, which in some ways resembles the FIG. 4 program fragment but in some ways differs therefrom, will now be described.

First, in the step 1, as before, a decision is made as to whether or not, at this time, the switch 33 for the starter 102 of the engine 100 is ON or not, i.e. as to whether or not said starter 102 is currently being operated to crank said engine 100 to start it. This decision is made by the microcomputer based upon the signal which it receives from said starter switch 33. If the answer to this decision is YES, then next the flow of control passes to the step 2; but otherwise, if the answer to this decision is NO, the flow of control passes back to this decision step 1 again, to execute a tight loop until in fact said starter 102 starts to be operated to crank the engine 100.

Figure 10:
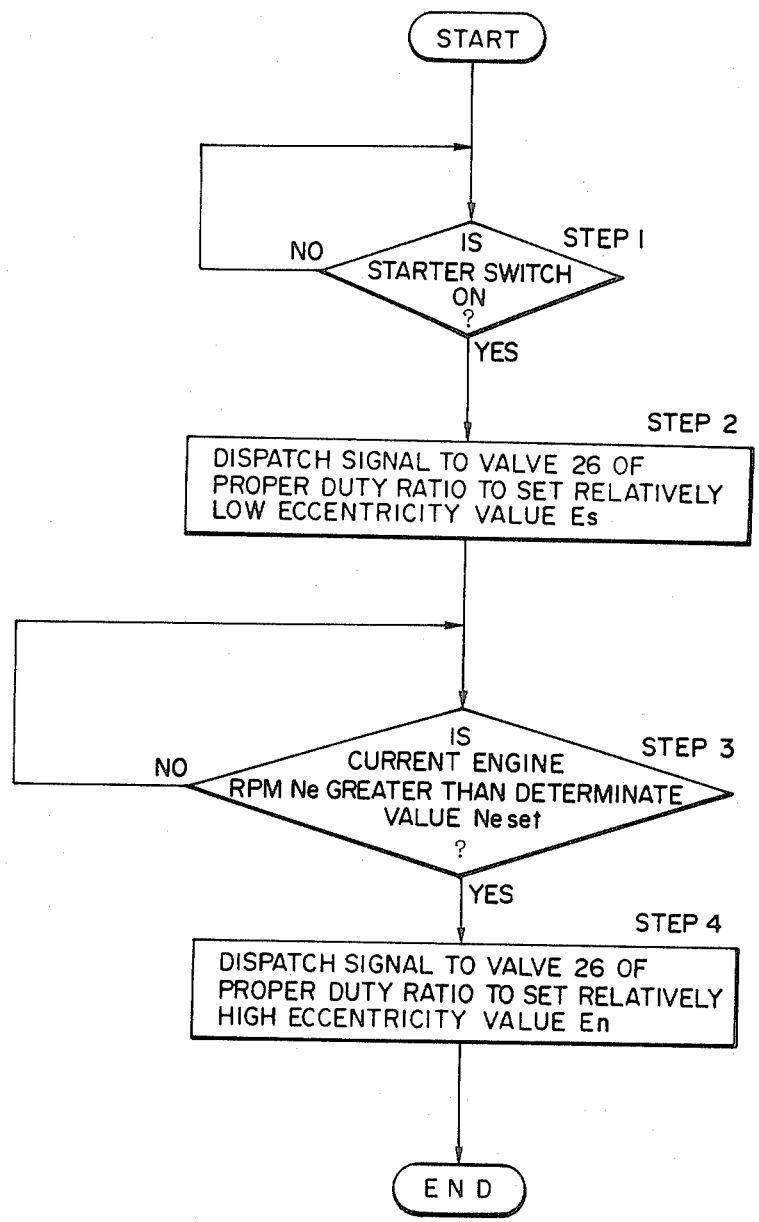
FIG. 10 is a flow chart for a portion of a program executed by a microprocessor incorporated in said third preferred embodiment of the control system of the present invention, similarly to the programs for the first and second preferred embodiments flow charts of which were shown in FIG. 4 and 7.

In the next step 2, at which point in the FIG. 10 program it has been determined that the starter 102 has now started to be operated, an electrical pulse signal is dispatched to the electromagnetic switching valve 26 of appropriate duty ratio D to cause the eccentricity of the slide ring 13 to be set to a relatively low eccentricity value Es for engine starting; and next the flow of control passes to the step 3. By a means which is not shown but is included in the electrical control device 30, this supply of this electrical pulse signal with this duty ratio is maintained until the next similar order for altering said duty ratio is given to said means.

In this step 3, quite differently from the corresponding steps 3 of the FIG. 4 program and the FIG. 7 program for the first and the second preferred embodiments, a decision is made as to whether or not, at this time, the current revolution speed Ne of the engine 100 is greater than a determinate value Neset. The engine revolution speed Ne is determined by the electrical control device 30 from the output signal of the sensor 35. The threshold value Neset is preferably determined as being substantially greater than the maximum rotational speed which the starter motor 102 is capable of giving to the crankshaft of the engine 100, while being equal to or somewhat less than the usual idling speed of said engine 100. If the answer to this step 3 decision is YES, so that the rotation of the engine 100 is no longer being solely caused by the starter motor 102 and accordingly the engine 100 has now started, then next the flow of control passes to the step 4; but otherwise, if the answer to this decision is NO, the flow of control passes back to this decision step 3 again, to execute a tight loop until in fact said engine 100 is no longer solely being rotated by the starter 102.

In the next and final program step 4, an electrical pulse signal is dispatched to the electromagnetic switching valve 26 of appropriate duty ratio D to cause the eccentricity of the slide ring 13 to be set to a relatively high or normal eccentricity value En; and next the flow of control passes to exit from this FIG. 10 program fragment, without doing anything further. Again, by the aforesaid signal maintaining means, this supply of this electrical pulse signal with this duty ratio is maintained until the next similar order for altering said duty ratio is given to said means.

According to the control method explained above, when the rotational speed of the engine 100 has become greater than that which can be solely caused by the starter motor 102, the eccentricity E of the slide ring 13 is increased. Thus, in this embodiment, before the engine 100 is started to be cranked by the starter motor 102, as before the rotational input member of the pump 11 is not being rotated at all, and accordingly said pump 11 is supplying no output pressure at all at its output side, which as explained above means that no pressure is supplied to the eccentricity control chamber 23 of said pump 11, accordingly causing the eccentricity E of the slide ring 13 to be maintained at its maximum possible value by the action of the compression coil spring 25. From this quiescent condition while the program is looping in the step 1 stage, as soon as the engine 100 is started to be cranked by the starter motor 102, the program transits through the step 2 stage to the step 3 stage and the duty ratio of the pulse signal being supplied to the electromagnetic switching valve 26 is abruptly raised and this causes the pressure output of the pump 11 initially to rise quickly up from zero, and as before by the feeding back of this pressure output to said eccentricity control chamber 23 of said pump 11, quickly the pump eccentricity E is set to its relatively low starting value Es. And depending upon this regulation of the eccentricity E to be equal to the relatively low eccentricity value Es at this time of engine cranking, correspondingly during this engine cranking operation the output of the pump 11 is controlled to be very much less than what it is during normal transmission operation. Accordingly, as before, the torque load imposed by said pump 11 on the starter motor 102 is much reduced, and the electrical load on the battery (not particularly shown) of the vehicle powering said starter motor 102 is likewise significantly reduced. Thus, as before, the starter motor 102 and the vehicle battery can be made smaller and lighter and more compact than they would otherwise be required to be, and also vehicle startability is enchanced.

On the other hand, when the engine 100 has started and the rotation thereof is not solely being driven by the starter motor 102, then the program passes through the step 4 stage, and thus quickly the pump eccentricity E is set to its relatively high normal value En. And depending upon this regulation of the eccentricity E to be relatively high at this time or normal engine operation, correspondingly during this engine normal operation the output of the pump 11 is controlled to be very much higher than what it was during starting motor cranking operation. Accordingly, the torque load imposed by said pump 11 on the vehicle engine 100 naturally becomes relatively high, but of course since said engine 100 has now started it is well able to bear said torque load; and no particular electrical load is imposed on the battery of the vehicle. Accordingly, the same type of advantages as obtained by the first and second preferred embodiments of the present invention are obtained.

Figure 11:
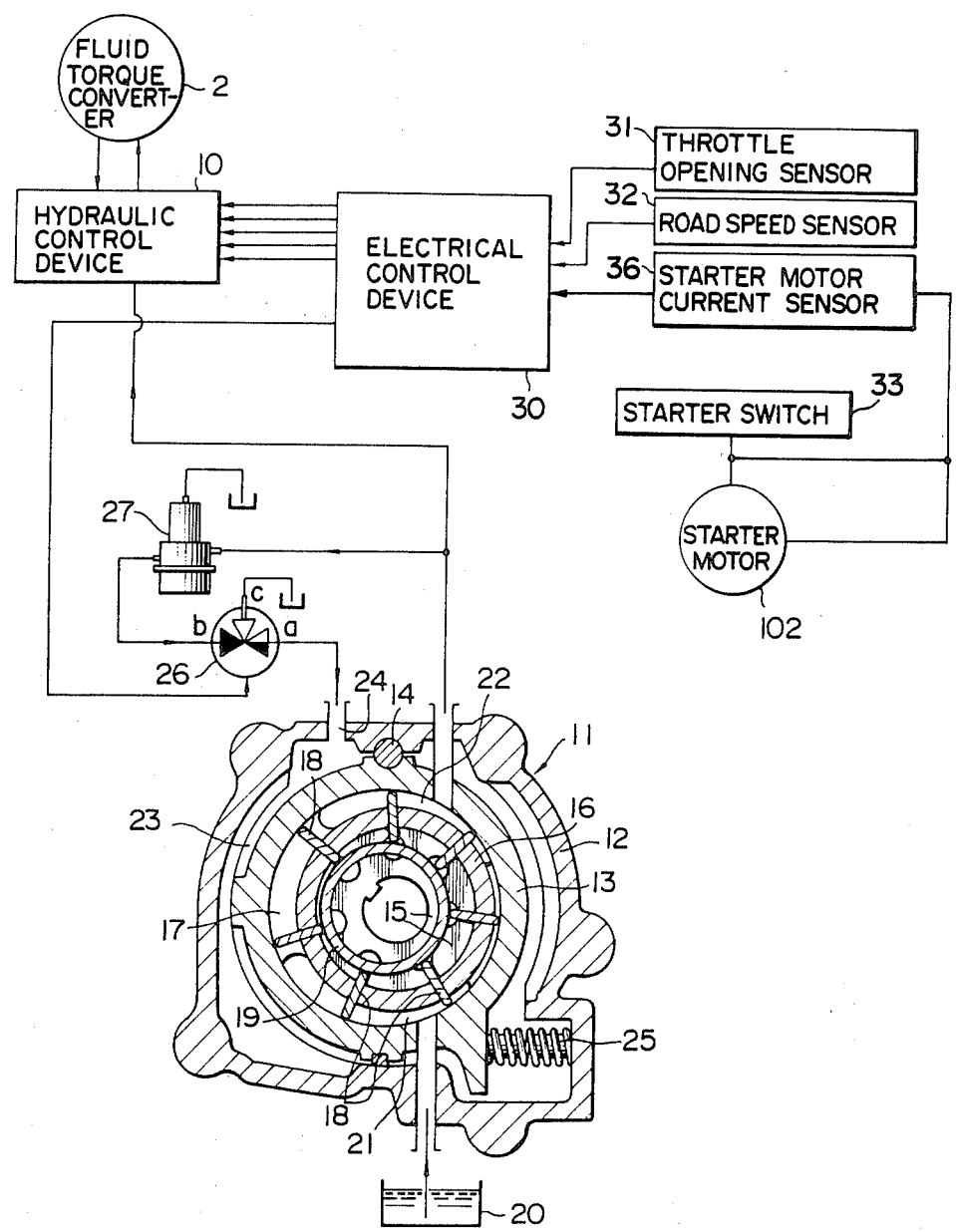
FIG. 11 is a combination drawing for the fourth preferred embodiment of the present invention, similar to FIGS. 2, 6, and 9 for the first through the third preferred embodiments, and particularly showing a starter motor current sensor further included in said fourth preferred embodiment.

In FIG. 11, in a fashion similar to FIG. 2, there are shown in block diagrammatical form relevant parts of the fourth preferred embodiment of the control system of the present invention, and also there is shown a transverse cross sectional view of the hydraulic fluid pump 11 controlled by this fourth preferred embodiment, which is again a mechanical type of hydraulic fluid pump whose output can be hydraulically regulated. The only physical difference in the mechanisms of this fourth preferred embodiment is that a starter motor current sensor 36 is provided, which senses a parameter representative of the current through the starter motor 102 for the engine 100 and which dispatches an electrical output signal representative thereof to the electrical control device 30. In this case, the starter switch 33 is not required to be connected to the electrical control device 30, as shown in the figure. The other portions of the transmission control device shown in FIG. 11 are similar to those described above with regard to the first preferred embodiment of the present invention. Corresponding to the new structure, in FIG. 12, in a fashion similar to FIG. 4, there is presented a flow chart showing the relevant parts of a possible program for the microcomputer incorporated in the electrical control device 30, in this fourth preferred embodiment of the system of the present invention, for practicing the fourth preferred embodiment of the method of the present invention. This program fragment, which in some ways resembles the FIG. 4 program fragment but in some ways differs therefrom, will now be described.

First, in the step 1, quite differently from the corresponding steps 1 of the FIG. 4, FIG. 7, and FIG. 10 programs for the first through the third preferred embodiments, a decision is made as to whether or not, at this time, the current through the starter motor 102 of the engine 100 is substantially zero or not, i.e. as to whether or not said starter 102 is currently being operated to crank said engine 100 to start it. This decision is made by the microcomputer based upon the signal which it receives from the starter current sensor 36. If the answer to this decision is YES, then next the flow of control passes to the step 2; but otherwise, if the answer to this decision is NO, the flow of control passes back to this decision step 1 again, to execute a tight loop until in fact said starter 102 starts to be operated to crank the engine 100.

Figure 12:
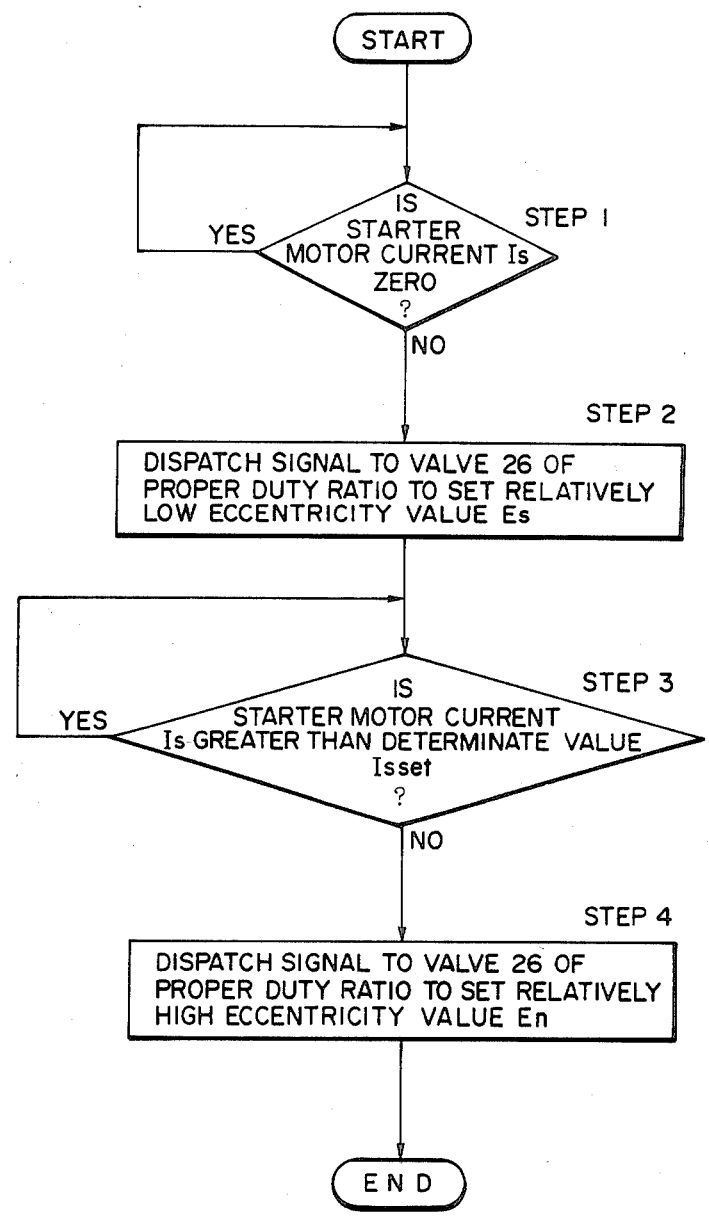
FIG. 12 is a flow chart for a portion of a program executed by a microprocessor incorporated in said fourth preferred embodiment of the control system of the present invention, similarly to the programs for the first through the third preferred embodiments flow charts of which were shown in FIG. 4, 7, and 10.

In the next step 2, at which point in the FIG. 12 program it has been determined that the starter 102 has now started to be operated, as before an electrical pulse signal is dispatched to the electromagnetic switching valve 26 of appropriate duty ratio D to cause the eccentricity of the slide ring 13 to be set to a relatively low eccentricity value Es for engine starting; and next the flow of control passes to the step 3. Again, by a means which is not shown but is included in the electrical control device 30, this supply of this electrical pulse signal with this duty ratio is maintained until the next similar order for altering said duty ratio is given to said means.

In this step 3, again quite differently from the corresponding steps 3 of the FIG. 4, FIG. 7, and FIG. 10 programs for the first through the third preferred embodiments, a decision is made as to whether or not, at this time, the current through the starter motor 102 of the engine 100 is greater than a determinate threshold value Isset. The current starter motor current Is is determined by the electrical control device 30 from the output signal of the sensor 36 therefor. The threshold value Isset is preferably determined as being substantially greater than the minimum current at which the starter motor 102 is capable of imparting any rotation to the crankshaft of the engine 100, while being equal to or somewhat less than the usual idling speed of said engine 100. If the answer to this step 3 decision is YES, so that the rotation of the engine 100 is no longer being caused by current passing through the starter motor 102 and accordingly the engine 100 has now started, then next the flow of control passes to the step 4; but otherwise, if the answer to this decision is NO, the flow of control passes back to this decision step 3 again, to execute a tight loop until in fact said engine 100 is no longer being rotated by current passing through the starter motor 102.

As before, in the next and final program step 4, an electrical pulse signal is dispatched to the electromagnetic switching valve 26 of appropriate duty ratio D to cause the eccentricity of the slide ring 13 to be set to a relatively high or normal eccentricity value En; and next the flow of control passes to exit from this FIG. 12 program fragment, without doing anything further. Again, by the aforesaid signal maintaining means, this supply of this electrical pulse signal with this duty ratio is maintained until the next similar order for altering said duty ratio is given to said means.

According to the control method explained above, when the current through the starter motor 102 has dropped below that which can rotate the starter motor 102, it is assumed that the engine 100 has started, and the eccentricity E of the slide ring 13 is increased. Thus, in this fourth preferred embodiment as in the previous ones, before the engine 100 is started to be cranked by the starter motor 102, as before the rotational input member of the pump 11 is not being rotated at all, and accordingly said pump 11 is supplying no output pressure at all at its output side, which as explained above means that no pressure is supplied to the eccentricity control chamber 23 of said pump 11, accordingly causing the eccentricity E of the slide ring 13 to be maintained at its maximum possible value by the action of the compression coil spring 25. From this quiescent condition while the program of FIG. 12 is looping in its step 1 stage, as soon as the engine 100 is started to be cranked by the starter motor 102, the program transits through the step 2 stage to the step 3 stage and the duty ratio of the pulse signal being supplied to the electromagnetic switching valve 26 is abruptly raised and this causes the pressure output of the pump 11 initially to rise quickly up from zero, and as before by the feeding back of this pressure output to said eccentricity control chamber 23 of said pump 11 quickly the pump eccentricity E is set to its relatively low starting value Es. And depending upon this regulation of the eccentricity E to be equal to the relatively low eccentricity value Es at this time of engine cranking, correspondingly during this engine cranking operation the output of the pump 11 is controlled to be very much less than what it is during normal transmission operation. Accordingly, as before, the torque load imposed by said pump 11 on the starter motor 102 is much reduced, and the electrical load on the battery (not particularly shown) of the vehicle powering said starter motor 102 is likewise significantly reduced. Thus, as before, the starter motor 102 and the vehicle battery can be made smaller and lighter and more compact than they would otherwise be required to be, and also vehicle startability is enhanced.

On the other hand, when the engine 100 has started and as shown by the current passing through the starter motor 102 the rotation thereof is not being driven by said starter motor 102, then the program passes through the step 4 stage, and thus quickly the pump eccentricity E is set to its relatively high normal value En. And depending upon this regulation of the eccentricity E to be relatively high at this time of normal engine operation, correspondingly during this engine normal operation the output of the pump 11 is controlled to be very much higher than what it was during starting cranking operation. Accordingly, the torque laod imposed by said pump 11 on the vehicle engine 100 naturally becomes relatively high, but of course since said engine 100 has now started it is well able to bear said torque load; and no particular electrical load is imposed on the battery of the vehicle. Accordingly, the same type of advantages as obtained by the first, second, and third preferred embodiments of the present invention are obtained.

Figure 13:
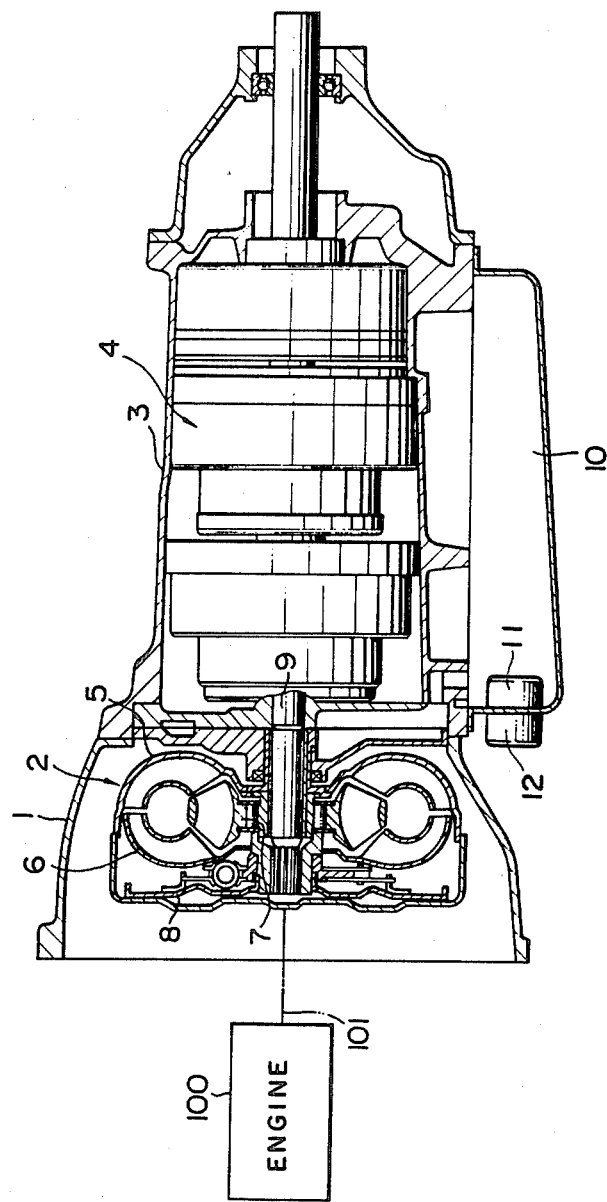
FIG. 13 is a schematic longitudinal sectional view showing the overall layout of the principal components of another automatic transmission, in this case not particularly showing any hydraulic fluid pump, to which certain others of the preferred embodiments of the present invention can be applied.
Figure 14:
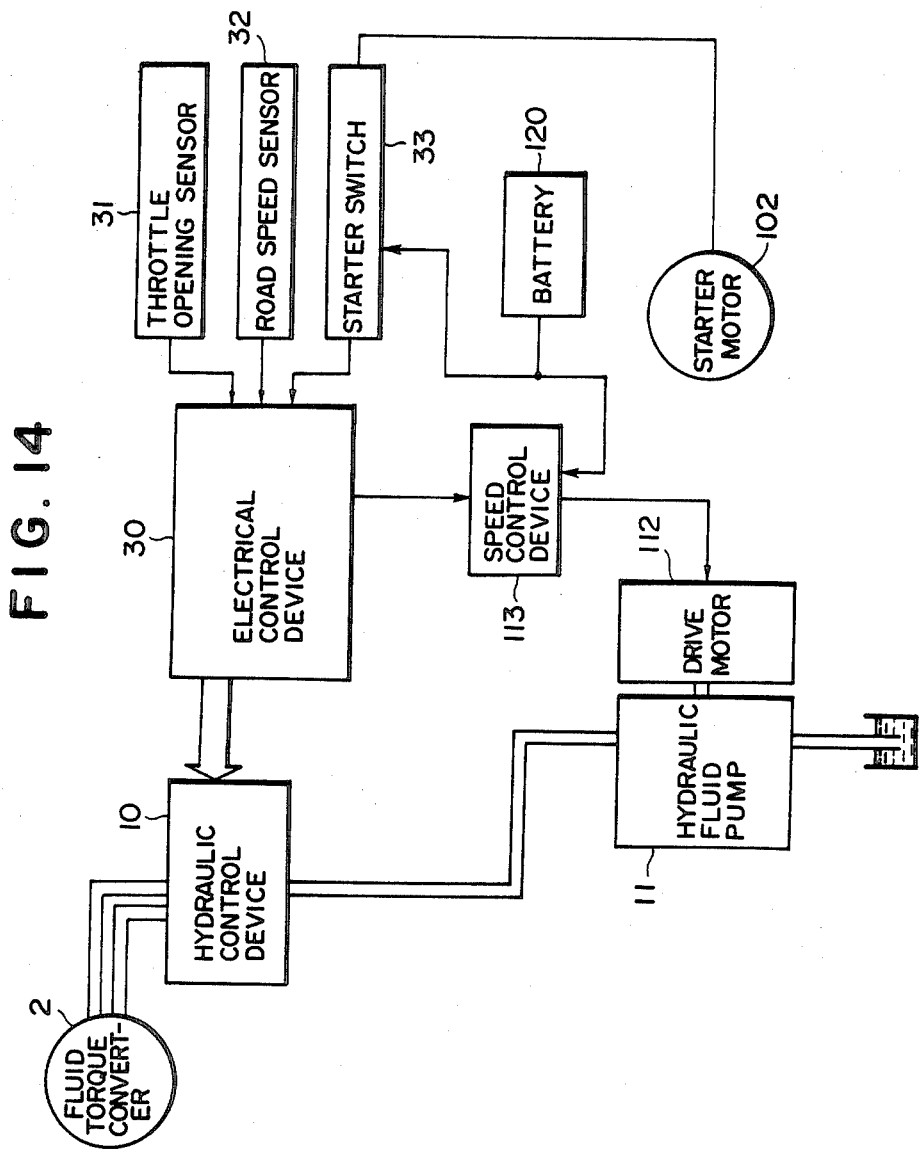
FIG. 14 is a combination drawing similar to FIG. 2 for the first preferred embodiment, being a schematic block diagram including, as blocks, relevant parts of the fifth preferred embodiment of the automatic transmission of the present invention, said second preferred embodiment including an electrically powered hydraulic fluid pump of the fixed output type.

FIG. 13 is a schematic longitudinal sectional view showing the overall layout of the principal components of another automatic transmission, which does not include any mechanically driven hydraulic fluid pump, and to which certain others of the preferred embodiments of the present invention can be applied; and in FIG. 14, in a fashion similar to FIG. 2 and others of the previous figures, there are shown in purely blcok diagrammatical form relevant parts of the fifth preferred embodiment of the control system of the present invention, and also there is shown by the blocks 11 and 112 an electrical type of hydraulic fluid pump which is controlled by said second preferred embodiment; in more detail, the block 11 represents the hydraulic fluid pump itself, and the block 112 represents an electric motor which drives it. This pump 11 and motor 112 are of per se known types—the pump 11, itself, is of a type which has a fixed pumping capacity, in other words whose pumping performance is determined according to the rotational speed of its input member—and the electric motor 112 driving said pump 11, which is powered by the battery 120 of the vehicle, can be controlled with regard to its rotational speed by the electrical control device 30 for the transmission, via a speed control circuit 113 which is also per se known and which regulates the current through said electric motor 112. The other portions of the transmission control device shown in FIG. 14 are similar to those described above with regard to the first preferred embodiment of the present invention. Corresponding to this new structure, in FIG. 15, in a fashion similar to FIG. 4, there is presented a flow chart showing the relevant parts of a possible program for the microcomputer incorporated in this electrical control device 30, in this fifth preferred embodiment of the system of the present invention, for practicing the fifth preferred embodiment of the method of the present invention. This program fragment, which in some ways resembles the FIG. 4 program fragment but in some ways differs therefrom, will now be described.

First, in the step 1, a decision is made as to whether or not, at this time, the switch 33 for the starter 102 of the engine 100 is ON or not, i.e. as to whether or not said starter 102 is currently being operated to crank said engine 100 to start it. This decision is made by the microcomputer based upon the signal which it receives from said starter switch 33. If the answer to this decision is YES, then next the flow of control passes to the step 2; but otherwise, if the answer to this decision is NO, the flow of control passes back to this decision step 1 again, to execute a tight loop until in fact said starter 102 starts to be operated to crank the engine 100. .

Figure 15:
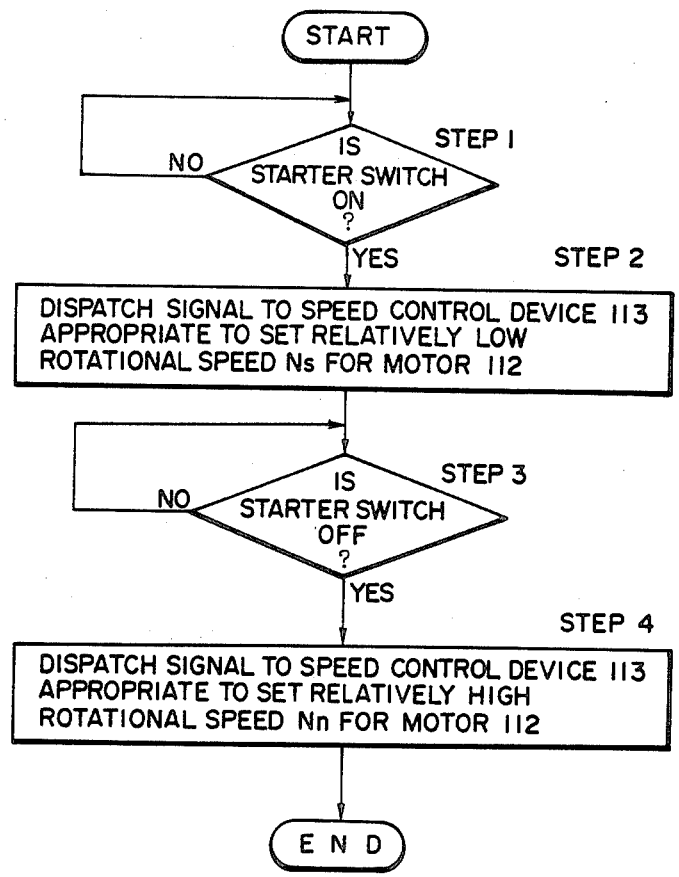
FIG. 15 is a flow chart for a portion of a program executed by a microprocessor incorporated in said fifth preferred embodiment of the control system of the present invention, similarly to the programs for the first through the fourth preferred embodiments flow charts of which were shown in FIG. 4, 7, 10, and 12.

In the next step 2, at which point in the FIG. 15 program it has been determined that the starter 102 has now started to be operated, an electrical signal is dispatched by the electrical control device 30 to the speed control device 113 of appropriate informational content to cause the motor 112 to drive the pump 11 at a relatively low rotational speed Ns for engine starting; and next the flow of control passes to the step 3. By a means which is not shown, this driving of the motor 112 at this relatively low starting speed is maintained until the next similar order for altering said engine rotational speed is given to said speed control device 113.

In the step 3, analogously to the step 1 but contrariwise, a decision is made as to whether or not, at this time, the switch 33 for the starter 102 of the engine 100 is OFF or not, i.e. as to whether or not said starter 102 is currently not being operated to crank said engine 100 to start it. Again, this decision is made by the microcomputer based upon the signal which it receives from said starter switch 33. If the answer to this decision is YES, then next the flow of control passes to the step 4; but otherwise, if the answer to this decision is NO, the flow of control passes back to this decision step 3 again, to execute a tight loop until in fact said starter 102 is no longer being operated to crank the engine 100.

In the next and final program step 4, at which point in the FIG. 15 program it has been determined that the starter 102 has now been stopped from being operated, an electrical signal is dispatched by the electrical control device 30 to the speed control device 113 of appropriate informational content to cause the motor 112 to drive the pump 11 at a relatively high or normal rotational speed Nn; and next the flow of control passes to exit from this FIG. 15 program fragment, without doing anything further. Again, by the aforesaid signal maintaining means, this driving of the motor 112 at this normal relatively speed is maintained until the next similar order for altering said engine rotational speed is given to said speed control device 113.

Figure 16:
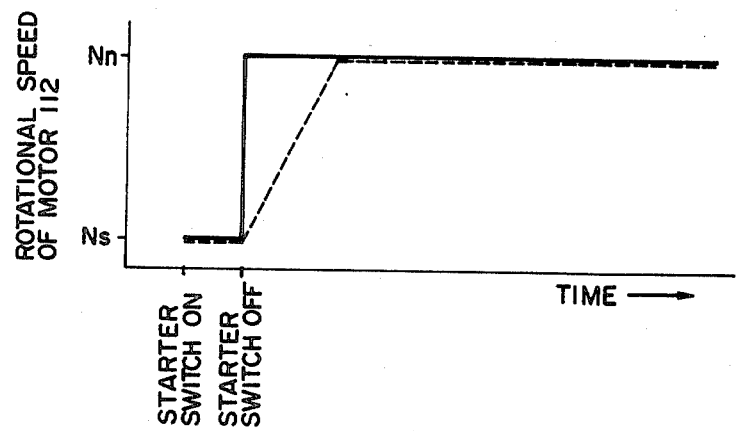
FIG. 16 is a graph relating to the operation of said fifth preferred embodiment, similar to FIG. 5 for the first preferred embodiment, in which elapsed time is shown along the horizontal axis and the rotational speed provided for said electrically powered hydraulic fluid pump as controlled by said fifth preferred device embodiment is shown along the vertical axis, showing the pump operational charactristics before, during, and after an engine cranking episode.

According to the control method explained above, during cranking of the engine 100 by the starter motor 102, the rotational speed of the drive motor 112 for the hydraulic fluid pump 11 is controlled with respect to elapsed time as shown by the solid line in the FIG. 16 graph, which is a time chart in which said rotational speed of the drive motor 112 as controlled by the speed control device 113 is shown along the vertical axis and elapsed time is shown along the horizontal axis. In more detail, before the engine 100 is started to be cranked by the starter motor 102, the state of the apparatus is not particularly specified. From this quiescent condition while the program is looping in the step 1 stage, as soon as the engine 100 is started to be cranked by the starter motor 102, the program transits through the step 2 stage to the step 3 stage and the rotational speed of the drive motor 112 for the hydraulic fluid pump 11 is established at its relatively low starting value Ns, as shown in the FIG. 16 graph. (Although this value Ns is shown as being a relatively small positive value, in this FIG. 16 graph, it might in an alternative embodiment be zero). And depending upon this regulation of the rotational speed of the drive motor 112 to this low value Ns at this time of engine dranking, correspondingly during this engine cranking operation the output of the pump 11 is controlled to be very much less than what it is during normal transmission operation. Accordingly, the electrical load on the battery 20 of the vehicle powering said starter motor 102 and said pump drive motor 112 is significantly reduced. Thus, the starter motor 102 and the vehicle battery can be made smaller and lighter and more compact than they would otherwise be required to be, and also vehicle startability is enhanced.

On the other hand, when the engine 100 starts the cranking thereof by the starter motor 102 is stopped, then the electrical control signal from the starter 33 to the electrical control device 30 so indicates, and the program passes through the step 4 stage, and thus quickly the rotational speed of the drive motor 112 for the hydraulic fluid pump 11 is established at its relatively high normal value Nn, as shown in the FIG. 16 graph. And depending upon this regulation of the rotational speed of the drive motor 112 to be relatively high at this time of normal engine operation, corresponding during this engine normal operation the output of the pump 11 is controlled to be very much higher than what it was during starting motor cranking operation. Accordingly, the electrical load imposed by said pump 11 on the battery 20 of the vehicle naturally becomes relatively high, but of course since said battery 20 is no longer being require to crank the engine 100 by operating the starter motor 102, and also since an electrical power generating means such as an alternator (not particularly shown) provided to said engine 100 is typically being operated at this time, now said battery 20 is well able to bear said electrical load. Thereby, the fluid torque converter 2 and the gear transmission mechanism 4 are properly and adequately supplied with hydraulic fluid pressure at substantially all times, according to their current operational circumstances. Thus, it is seen that, according to such a structure and such a method according to the present invention, satisfactory control of the hydraulic fluid pump can be exerted, and it is ensured that the transmission is never short of hydraulic fluid pressure during actual vehicle operation. Since high pump pressure is only provided when required, and heavy drain on the battery 20 is accordingly avoided, accordingly engine startability is enhanced and the power of the battery 20 is not wasetd. Thus, good fuel economy is promoted. Further, this control system and method ensure that the elements of the transmission are definitely well supplied with good lubrication at all times.

As a variation of this fifth preferred embodiment, as suggested by the dashed line in FIG. 16, it would be possible to increase the rotational speed of the drive motor 112 for the pump 11, when the starter switch 33 was turned OFF to stop cranking the engine 100 (i.e., when said engine 100 had started), not abruptly, but instead steadily over a certain time interval. Various possibilities for modification to the FIG. 15 program fragment to enable this variation will be easily conceived of by one of ordinary skill in the relevant art based upon the descriptions herein: accordingly, no explanation of any particular one thereof will be given herein, in view of the desirability of conciseness. In such a variant embodiment, problems with possible high strain on the battery 20 when the engine 100 has just started, which might be caused if the output pressure of the pump 11 were required to rise too abruptly, are positively prevented.

Now, although such further embodiments will not be particularly described in detail herein in view of predilections against prolixness of explanation, although they will be claimed in the Claims of this application, it is possible of course to apply the modified concepts of the second, third, and fourth preferred embodiments of the present invention, described above with respect to a mechanically driven type hydraulic fluid pump such as the FIG. 2 one, to this type of electrically driven hydraulic fluid pump of FIG. 14 also. The details of such parallel modifications will be easily conceived of by one of ordinary skill in the relevant art based upon the descriptions herein.

Although the present invention has been described in terms of the preferred embodiments thereof detailed above, and with reference to the illustrative drawings, it should not be considered as limited thereby, since various alterations, omissions, and/or modifications to the details of the shown preferred embodiments could be made without departing from the scope of the present invention. For example, although throttle opening has been taken as a parameter representative of engine load in the shown preferred embodiments, in other embodiments some other parameter, such as accelerator pedal depression, engine output shaft torque, or fuel supply rate, could be used to represent engine load. Various other possibilities could be considered. Further, the details of the appended drawings are only to be taken as being exemplary, and not as being limiting, since in other possible embodiments these details could be departed from without straying from the scope of the present invention. Accordingly the scope of the present invention, and of the protection sought to be granted by Letters Patent, should be considered as defined, not by the perhaps purely fortuitous details of the shown preferred embodiments, or of the drawings, but solely by the legitimate and proper scope of the claims, which follow.

What is claimed is:

1. A control method of controlling output of a pump in a vehicle equipped with an internal combustion engine, a battery, a starter motor powered by said battery for starting up said engine, and a hydraulically actuated automatic transmission system including a hydraulic fluid pump for supplying pressurized fluid therefor, said pump being adapted to be driven either by said engine or a pump drive motor powered by said battery, said method comprising the steps of:
deciding whether or not said engine is being started by said starter motor; and
decreasing the output of said pump when it is thus decided that said engine is being started.

2. A control method according to claim 1, said hydraulic fluid pump being one adapted to be driven by said engine and whose output per one revolution of its input member is variable, wherein said output of said hydraulic fluid pump is thus controlled by decreasing said output of said pump per one revolution of its input member when it is thus decided that said engine is being started.

3. A control method according to claim 2, said hydraulic fluid pump being a variable capacity type vane type hydraulic fluid pump the output of which per one revolution of its input member is controlled by varying the eccentric position of a controlling member thereof, wherein said output of said hydraulic fluid pump per one revolution of its input member is thus controlled by varying said eccentric position of said controlling member to give an output of said pump per one revolution of its input member which is decreased when it is thus decided that said engine is being started.

4. A control method according to claim 1, said hydraulic fluid pump being a fixed capacity type electrically driven type hydraulic fluid pump adapted to be driven by said pump drive motor, the output of which per one revolution of its input member is substantially constant, wherein said output of said hydraulic fluid pump is thus controlled by varying the rotation speed of its said input member to decrease when it is thus decided that said engine is being started.

5. A control method according to claim 4, said rotation speed of said input member of said hydraulic fluid pump being controlled to be substantially zero when it is thus decided that said engine is being started.

6. A control method according to claim 1, said decision that said engine is being started being accomplished by detecting whether or not a starter switch for supplying current to said starter motor for said engine is ON or OFF.

7. A control method according to claim 6, said output of said hydraulic fluid pump being increased relatively suddenly when it is detected that said starter switch for supplying current to said starter motor for said engine has transited to the OFF condition from the ON condition.

8. A control method according to claim 6, said output of said hydraulic fluid pump being increased relatively gradually when it is detected that said starter switch for supplying current to said stater motor for said engine has transited to the OFF condition from the ON condition.

9. A control method according to claim 1, said decision that said engine is being started being accomplished by detecting whether or not a certain determinate time interval has elapsed since a starter switch for supplying current to said starter motor for said engine was turned ON.

10. A control method according to claim 9, said certain determinate time interval being determined to be a monotonically decreasing function of a parameter representing the warming up condition of the engine.

11. A control method according to claim 10, said parameter representing the warming up condition of the engine coolant temperature.

12. A control method according to claim 9, said parameter representing the warming up condition of the engine being engine lubricant temperature.

13. A control method according to claim 1, said decision that said engine is being started being accomplished by detecting whether or not, since a starter switch for supplying current to said starter motor for said engine was turned ON, engine rotational speed has risen above a determinate value.

14. A control method according to claim 1, said decision that said engine is being started being accomplished by detecting whether or not a current being supplied to said starter motor for said engine is greater than a determinate value.

15. A control system for controlling output of a pump in a vehicle equipped with an internal combustion engine, a battery, a starter motor powered by said battery for starting up said engine, and a hydraulically actuated automatic transmission system including a hydraulic fluid pump for supplying pressurized fluid therefor, said pump being adapted to be driven either by said engine or a pump drive motor powered by said battery, said system comprising:
a means for deciding whether or not said engine is being started by said starter motor; and
a means for decreasing the output of said pump when it is thus decided that said engine is being started.

16. A control system according to claim 15, said hydraulic fluid pump being one adapted to be driven by said engine and whose output per one revolution of its input member is variable, wherein said means for controlling the output of said hydraulic fluid pump does so by decreasing said output of said pump per one revolution of its input member when it is thus decided that said engine is being started.

17. A control system according to claim 16, said hydraulic fluid pump being a variable capacity type vane type hydraulic fluid pump the output of which per one revolution of its input member is controlled by varying the eccentric position of a controlling member thereof, wherein said means for controlling the output of said hydraulic fluid pump per one revolution of its input member does so by varying said eccentric position of said controlling member to give an output of said pump per one revolution of its input member which is decreased when it is thus decided that said engine is being started.

18. A control system according to claim 15, said hydraulic fluid pump being a fixed capacity type electrically driven type hydraulic fluid pump adapted to be driven by said pump drive motor, the output of which per one revolution of its input member is substantially constant, wherein said means controlling the output of said hydraulic fluid pump does so by decreasing the rotation of speed of its said input member when it is thus decided that said engine is being started.

19. A control system according to claim 18, where said means for controlling the output of said hydraulic fluid pump controls said rotation speed of said input member thereof to be substantially zero when it is thus decided that said engine is being started.

20. A control system according to claim 15, said means for deciding whether or not said engine is being started making said decision by detecting whether or not said starter switch for supplying current to a starter motor for said engine is ON or OFF.

21. A control system according to claim 20, said means for controlling the output of said hydraulic fluid pump increasing said output of said hydraulic fluid pump relatively suddenly when it is detected that said starter switch for supplying current to said starter motor for said engine has transited to the OFF condition from the ON condition.

22. A control system according to claim 20, said means for controlling the output of said hydraulic fluid pump increasing said output of said hydraulic fluid pump relatively gradually when it is detected that said starter switch for supplying current to said starter motor for said engine has transited to the OFF condition from the ON condition.

23. A control system according to claim 15, said means for deciding whether or not said engine is being started making said decision by detecting whether or not a certain determinate time interval has elapsed since said starter switch for supplying current to a starter motor for said engine was turned ON.

24. A control system according to claim 23, said certain determinate time interval being determined to be a monotonically decreasing function of a parameter representing the warming up condition of the engine.

25. A control system according to claim 24, said parameter representing the warming up condition of the engine being engine coolant temperature.

26. A control system according toot claim 24, said parameter representing the warming up condition of the engine being engine lubricant temperature.

27. A control system according to claim 15, said means for deciding whether or not said engine is being started comprising an engine rotational speed sensor, and making said decision by detecting whether or not, since a starter switch for supplying current to said starter motor for said engine was turned ON, engine rotational speed has risen above a determinate value.

28. A control system according to claim 15, said means for deciding whether or not said engine is being started comprising a means for determining a current being supplied to said starter motor for said engine, and making said decision by detecting whether or not said current is greater than a determinate value.

* * * * *